United States Patent
Harrison et al.

(10) Patent No.: US 9,249,478 B2
(45) Date of Patent: Feb. 2, 2016

(54) SELECTIVE RECOVERY OF MANGANESE, LEAD AND ZINC

(71) Applicant: Simbol Inc., Pleasanton, CA (US)

(72) Inventors: Stephen Harrison, Benicia, CA (US); C. V. Krishnmohan Sharma, Milpitas, CA (US); Pei-Yu Lan, Pleasanton, CA (US)

(73) Assignee: Simbol, Inc., Pleasanton, CA (US)

( * ) Notice: Subject to any disclaimer, the term of this patent is extended or adjusted under 35 U.S.C. 154(b) by 317 days.

(21) Appl. No.: 13/827,616

(22) Filed: Mar. 14, 2013

(65) Prior Publication Data

US 2013/0209336 A1 Aug. 15, 2013

Related U.S. Application Data

(63) Continuation-in-part of application No. 13/539,106, filed on Jun. 29, 2012, now Pat. No. 8,518,232, which is a continuation-in-part of application No. 12/880,924, filed on Sep. 13, 2010, now Pat. No. 8,454,816.

(60) Provisional application No. 61/502,736, filed on Jun. 29, 2011, provisional application No. 61/241,479, filed on Sep. 11, 2009.

(51) Int. Cl.
*C22B 3/00* (2006.01)
*C22B 47/00* (2006.01)
*C22B 19/00* (2006.01)
*C22B 3/38* (2006.01)

(52) U.S. Cl.
CPC .......... *C22B 13/04* (2013.01); *C22B 3/005* (2013.01); *C22B 19/00* (2013.01); *C22B 19/26* (2013.01); *C22B 47/00* (2013.01); *C22B 47/0063* (2013.01)

(58) Field of Classification Search
None
See application file for complete search history.

(56) References Cited

U.S. PATENT DOCUMENTS

| | | |
|---|---|---|
| 4,016,075 A | 4/1977 | Wilkins |
| 4,116,856 A | 9/1978 | Lee et al. |
| 4,159,311 A | 6/1979 | Lee et al. |
| 4,221,767 A | 9/1980 | Lee et al. |
| 4,291,001 A | 9/1981 | Repsher et al. |
| 4,347,327 A | 8/1982 | Lee et al. |
| 4,348,295 A | 9/1982 | Burba, III |
| 4,348,296 A | 9/1982 | Bauman et al. |
| 4,348,297 A | 9/1982 | Bauman et al. |
| 4,376,100 A | 3/1983 | Lee et al. |
| 4,430,311 A | 2/1984 | Lee et al. |

(Continued)

OTHER PUBLICATIONS

Cole et al., "Zinc Solvent Extraction in the Process Industries", 24(2) Mineral Proc. & Extractive Metallurgy Rev (2003), pp. 91-137.
Dreisinger et al., "New Developments in the Boleo Copper—Cobalt—Zinc—Manganese Project", available at http://bajamining.com/_resources/Reports/alta_paper_2006_boleo_final.pdf.

(Continued)

*Primary Examiner* — Melissa Swain
(74) *Attorney, Agent, or Firm* — Fish & Tsang, LLP

(57) ABSTRACT

This invention relates to a method for the selective recovery of manganese and zinc from brines that includes the steps of contacting a brine with an ionic liquid in order to selectively extract manganese and zinc from the brine into the ionic liquid; and treating the ionic liquid containing extracted manganese and zinc with an aqueous solution to selectively precipitate manganese, producing a manganese depleted, zinc rich ionic liquid. The method can further include the steps of treating the manganese depleted, zinc rich ionic liquid with an aqueous solution to selectively precipitate zinc.

20 Claims, 18 Drawing Sheets

(56) References Cited

U.S. PATENT DOCUMENTS

| | | | |
|---|---|---|---|
| 4,461,714 | A | 7/1984 | Burba, III |
| 4,472,362 | A | 9/1984 | Burba, III |
| 4,540,509 | A | 9/1985 | Burba, III |
| 4,727,167 | A | 2/1988 | Burba, III et al. |
| 5,135,652 | A | 8/1992 | Boateng |
| 5,254,225 | A | 10/1993 | Gallup |
| 5,389,349 | A | 2/1995 | Bauman et al. |
| 5,599,516 | A | 2/1997 | Bauman et al. |
| 6,017,500 | A | 1/2000 | Mehta |
| 6,280,693 | B1 | 8/2001 | Bauman et al. |
| 6,458,184 | B2 | 10/2002 | Featherstone |
| 6,555,078 | B1 | 4/2003 | Mehta |
| 6,682,644 | B2 * | 1/2004 | Featherstone et al. ........ 205/539 |
| 2001/0000597 | A1 | 5/2001 | Featherstone |
| 2003/0226761 | A1 | 12/2003 | Featherstone et al. |
| 2004/0097755 | A1 * | 5/2004 | Abbott et al. ................ 562/553 |

OTHER PUBLICATIONS

Gotfryd et al., "Recovery of Zinc(II) from Acidic Sulfate Solutions. Simulation of Counter-Current Extraction Stripping Process", 38 Physiochemical Problems of Mineral Processing (2004), pp. 113-120.

Kawai et al., "Solvent extraction of zinc(II) and manganese(II) with 5,10,15,20-tetrapheny1-21H, 23H-porphine(TPP) through the metal exchange reaction of lead(II)-TPP", 7 Solvent Extr. Res. Dev. Japan (2000), pp. 36-43.

Lee et al., "Solvent Extraction of Zinc from Strong Hydrochloric Acid Solution with Alamine 336", 30(7) Bull. Korean Chem. Soc. (2009), pp. 1526-1530.

Co-pending U.S. Appl. No. 12/880,924, filed Sep. 11, 2009 (Allowed, Oct. 3, 2012).

Co-pending U.S. Appl. No. 13/539,106, filed Jun. 29, 2012.

* cited by examiner

SELECTIVE RECOVERY OF MANGANESE, LEAD AND ZINC

This application is a continuation-in-part of U.S. non-provisional patent application Ser. No. 13/539,106, which claims priority to U.S. provisional patent application Ser. No. 61/502,736, filed Jun. 29, 2011, and is also a continuation-in-part of U.S. non-provisional patent application Ser. No. 12/880,924, which claims priority to U.S. Prov. Pat. App. No. 61/241,479, flied Sep. 11, 2009, all of which are incorporated herein by reference.

BACKGROUND OF THE INVENTION

1. Technical Field of the Invention

This invention generally relates to the field of selectively removing manganese and zinc from brines. More particularly, the invention relates to methods for the selective removal and recovery of manganese and zinc from brines, preferably without the simultaneous removal of other ions from the brines.

2. Description of the Prior Art

A number of brine sources exist naturally. For instance, brine sources include brine deposits like the Salar de Atacama in Chile, Silver Peak Nev., Salar de Uyuni in Bolivia, or the Salar de Hombre Muerte in Argentina. Other common brine sources are geothermal, oilfield, Smackover, and relict hydrothermal brines. These brines, however, have not previously been very well commercially exploited.

Geothermal brines are of particular interest for a variety of reasons. First, geothermal brines provide a source of power due to the fact that hot geothermal pools are stored at high pressure underground, which when released to atmospheric pressure, can provide a flash-steam. The flash-stream can be used, for example, to run a power plant. Additionally, geothermal brines contain useful elements, which can be recovered and utilized for secondary processes. With some geothermal waters and brines, binary processes can be used to heat a second fluid to provide steam for the generation of electricity without the flashing of the geothermal brine.

One problem associated with geothermal brines when utilized for the production of electricity results from scaling and deposition of solids. Silica and other solids that are dissolved within the geothermal brine precipitate out during all stages of brine processing, particularly during the cooling of a geothermal brine, and may eventually result in fouling of the injection wells or processing equipment.

It is known that brines can include various metal ions, particularly alkali and alkaline earth metals, as well as silica, iron, lead, silver, zinc and manganese, in varying concentrations, depending upon the source of the brine. Recovery of these metals is potentially important to the chemical, pharmaceutical and electronics industries. Typically, the economic recovery of desired metals from natural brines, which may vary widely in composition, depends not only on the specific concentration of the desired metal, but also upon the concentrations of interfering ions, particularly silica, calcium and magnesium, because the presence of the interfering ions will increase recovery costs as additional steps must be taken to remove the interfering ions, before the desired metals are recovered.

Although conventional processing of ores and brines currently employed can be used to recover a portion of the manganese and zinc present in brines, there still exists a need to develop economic methods that are selective for the removal and recovery of manganese and zinc from the brines at high yields and high purity.

SUMMARY OF THE INVENTION

Methods for the selective removal and recovery of manganese and zinc metals and compounds from brines are provided.

In an embodiment, a method for recovering manganese from a brine is provided. This method included the steps of providing a brine that contains manganese; contacting this brine with an ionic liquid and producing an ionic liquid containing extracted manganese; and treating this ionic liquid containing extracted manganese with an aqueous solution to selectively recover manganese from the ionic liquid. In certain embodiments, the ionic liquid is a phosphonium based ionic liquid. In certain embodiments, the phosphonium based ionic liquid is trihexyl(tetradecyl) phosphonium chloride. In certain embodiments, the aqueous solution used to recover manganese from the ionic liquid is water. In certain embodiments, the aqueous solution used to recover manganese from the ionic liquid is an acid.

In an embodiment, a method for recovering manganese and zinc from a brine is provided. The method includes the steps of: providing a brine that contains manganese and zinc ions; contacting the brine with an ionic liquid in order to selectively extract manganese and zinc from the brine into the ionic liquid; and treating the ionic liquid containing extracted manganese and zinc with an aqueous solution to selectively precipitate manganese, producing a manganese depleted, zinc-rich ionic liquid. The method can further include the steps of treating the manganese depleted, zinc-rich ionic liquid with an aqueous solution to selectively precipitate zinc. In certain embodiments, the ionic liquid is a phosphonium based ionic liquid. In certain embodiments, the phosphonium based ionic liquid is trihexyl(tetradecyl) phosphonium chloride or Cyphos IL 101 (available from Cytec Industries). In certain embodiments, water can be used to precipitate manganese from the ionic liquid. In alternate embodiments, acid can be used to precipitate manganese from the ionic liquid. Exemplary acids include hydrochloric acid and sulfuric acid. In certain embodiments, the acids are at a concentration between about 0.25 to 1.25 Molar.

In certain embodiments of the method, the aqueous solution used to precipitate zinc from the manganese depleted zinc-rich ionic liquid is water. In alternate embodiments, the water is treated with a base to produce a pH suitable to precipitate zinc. In certain embodiments, the pH range of the water is between about 6 to 8.

In certain embodiments of the method, the ionic liquid containing extracted manganese and zinc also contains lead. After selective extraction of manganese and zinc as described above, the ionic liquid can be further treated to remove lead as described herein.

In another embodiment, a method for recovering zinc and manganese ions from a brine is provided. The method includes the steps of: providing a brine that includes manganese and zinc ions; selectively removing silica and iron from the brine to produce a substantially silica free brine; adjusting the pH of the substantially silica free brine to a pH suitable to form precipitates of zinc and manganese as hydroxides and oxides, such that precipitates of zinc and manganese are selectively formed and other metal precipitates are not formed; and separating the zinc and manganese precipitates from the brine. The method can further include the steps of dissolving the precipitates of zinc and manganese to produce a zinc manganese solution; oxidizing the manganese to form a manganese precipitate and a zinc solution; separating the manganese precipitate from the zinc solution; and recovering the zinc by electrochemical means. The zinc solution can be contacted with hydrochloric acid to produce zinc chloride, or alternatively can be contacted with sulfuric acid to produce zinc sulfate.

In another embodiment, a method for recovering zinc and manganese from a brine is provided. The method includes the steps of: providing a brine that includes manganese and zinc ions; selectively removing silica and iron from the brine to produce a substantially silica free brine that includes manganese and zinc; removing the zinc from the substantially silica free brine by means of an ion exchange or other process; extracting manganese from the substantially silica free brine; oxidizing the manganese to produce a manganese dioxide precipitate; and recovering the manganese dioxide precipitate. In certain embodiments, the process can include the recycling of various solutions to dissolve manganese and zinc precipitates.

In another embodiment, a method for recovering zinc and manganese from a brine is provided. The method includes the steps of: providing a brine that includes manganese and zinc; selectively removing silica and iron from the brine to produce a substantially silica free brine that includes manganese and zinc; extracting manganese and zinc from the substantially silica free brine to produce a manganese zinc solution; electrochemically removing manganese as manganese metal or manganese dioxide from the manganese zinc solution to produce a residual solution that includes zinc; and electrochemically removing zinc from the residual solution. In certain embodiments, the manganese dioxide and zinc can be recovered in a single electrochemical cell.

In another embodiment, a method for recovering zinc and manganese from a brine is provided. The method includes the steps of: providing a brine that includes manganese and zinc; selectively removing silica and iron from the brine to produce a substantially silica free brine that includes manganese and zinc; adjusting the pH of the substantially silica free brine to a pH suitable to form precipitates of zinc and manganese, such that precipitates of zinc and manganese are selectively formed and other metal precipitates are not formed; and separating the zinc and manganese precipitates from the brine. This embodiment can also include the steps of dissolving the precipitates of zinc and manganese to produce a zinc manganese solution; extracting zinc by solvent extraction; recovering and oxidizing the manganese to form a manganese dioxide precipitate and a zinc solution; separating the manganese precipitate from the zinc solution; and recovering the zinc by electrochemical means. In certain embodiments, the oxidation of the manganese is by chemical means. In alternate embodiments, the oxidation of manganese is by electrochemical means.

In another embodiment, a method for recovering zinc and manganese from a brine is provided. The method includes the steps of: providing a brine that includes manganese and zinc; selectively removing silica and iron from the brine to produce a substantially silica free brine that includes manganese and zinc; adjusting the pH of the substantially silica free brine to a pH suitable to form precipitates of zinc and manganese, such that precipitates of zinc and manganese are selectively formed and other metal precipitates are not formed; and separating the zinc and manganese precipitates from the brine. This embodiment can further include the steps of dissolving the precipitates of zinc and manganese to produce a zinc manganese solution; extracting manganese by solvent extraction and then recovering manganese; recovering and oxidizing the dissolved manganese to form a manganese dioxide precipitate and a zinc solution; and recovering the zinc by electrochemical means. In certain embodiments, the recovery of manganese is by oxidation. In certain embodiments, the oxidation of the manganese is by chemical means. In alternate embodiments, the oxidation of manganese is by electrochemical means. In further embodiments, manganese is recovered by electrochemical reduction.

In another embodiment, a method for recovering zinc and manganese from a brine is provided. The method includes the steps of: providing a brine that includes manganese and zinc; selectively removing silica and iron from the brine to produce a substantially silica free brine that includes manganese and zinc; adjusting the pH of the substantially silica free brine to a pH suitable to form precipitates of zinc and manganese, such that precipitates of zinc and manganese are selectively formed and other metal precipitates are not formed; and separating the zinc and manganese precipitates from the brine. This embodiment can further include the steps of dissolving the precipitates of zinc and manganese to produce a zinc manganese solution; extracting by way of a double solvent extraction both zinc and manganese in two separate streams; recovering and oxidizing the dissolved manganese to form a manganese dioxide precipitate and a zinc solution; and recovering the zinc by electrochemical means. In certain embodiments, the oxidation of the manganese is by chemical means. In alternate embodiments, the oxidation of manganese is by electrochemical means.

In another embodiment, a method for recovering zinc and manganese from a brine is provided. The method includes the steps of: providing a brine that includes manganese and zinc; selectively removing silica and iron from the brine to produce a substantially silica free brine that includes manganese and zinc; adjusting the pH of the substantially silica free brine to a pH suitable to form precipitates of zinc and manganese as hydroxides and oxides, such that precipitates of zinc and manganese are selectively formed and other metal precipitates are not formed; and separating the zinc and manganese precipitates from the brine. This embodiment can also include the steps of dissolving the precipitates of zinc and manganese to produce a zinc manganese solution; extracting by way of a double solvent extraction both zinc and manganese in two separate streams; recovering and reducing the dissolved manganese to form a manganese metal electrolytically and a zinc solution; and recovering the zinc by electrochemical means.

In another embodiment, a method for recovering zinc and manganese from a brine is provided. The method includes the steps of: providing a brine that includes manganese and zinc; selectively removing silica and iron from the brine to produce a substantially silica free brine that includes manganese and zinc; adjusting the pH of the substantially silica free brine to a pH suitable to form precipitates of zinc and manganese, such that precipitates of zinc and manganese are selectively formed and other metal precipitates are not formed; and separating the zinc and manganese precipitates from the brine. This embodiment can also include the steps of dissolving the precipitates of zinc and manganese to produce a zinc manganese solution; extracting by way of a double solvent extraction both zinc and manganese in two separate streams; reacting the manganese stream to produce a manganese salt; and reacting the zinc stream to produce a zinc salt. In certain embodiments, the manganese salt is selected from manganese carbonate, manganese sulfate, and a manganese halide. In certain embodiments, the zinc salt is selected from zinc carbonate, zinc sulfate, or a zinc halide.

In another embodiment, a method for recovering zinc and manganese from a brine is provided. The method includes the steps of: providing a brine that includes manganese and zinc; selectively removing silica and iron from the brine to produce a substantially silica free brine that includes manganese and zinc; recovering zinc by contacting the substantially silica free brine with an ion exchange resin, and recovering manganese from the solution by electrolytically depositing manganese dioxide from the substantially silica free brine. Optionally, following removal of the zinc and manganese, the remaining brine solution can be recycled to the step for recovering zinc by contacting with the ion exchange resin. In an alternate embodiment, the ion exchange resin is a basic anionic exchange resin.

In another embodiment, a method for recovering zinc and manganese from a brine is provided. The method includes the steps of: providing a brine that includes manganese and zinc; selectively removing silica and iron from the brine to produce a substantially silica free brine that includes manganese and zinc. The method includes adjusting the pH of the substantially silica free brine to a pH suitable to form precipitates of zinc and manganese, such that precipitates of zinc and manganese are selectively formed and other metal precipitates are not formed, and separating the manganese and zinc precipitates from the brine. The method can further include the steps of dissolving the precipitates of zinc and manganese in an acid to produce a zinc and manganese containing acid solution and extracting the zinc and manganese containing acid solution with an extraction solvent to produce a first liquid phase that includes the extraction solvent and zinc and a second liquid phase that includes manganese. The first and second liquid phases are separated and then zinc is electrochemically recovered from the first liquid phase. The second liquid phase is reduced to form $Mn^+$ and the second liquid phase is supplied to an electrochemical cell and manganese is recovered by electrochemical means.

In another embodiment, a method for recovering zinc and manganese from a brine is provided. The method includes the steps of: providing a brine that includes manganese and zinc; selectively removing silica and iron from the brine to produce a substantially silica free brine that includes manganese and zinc. The method includes adjusting the pH of the substantially silica free brine to a pH suitable to form precipitates of zinc and manganese, such that precipitates of zinc and manganese are selectively formed and other metal precipitates are not formed, and separating the manganese and zinc precipitates from the brine. The method can further include the steps of dissolving the precipitates of zinc and manganese in ammonium sulfate to produce a zinc and manganese containing ammonium sulfate solution and extracting the zinc and manganese containing ammonium sulfate solution with an extraction solvent to produce a first liquid phase that includes the extraction solvent and zinc and a second liquid phase that includes manganese and ammonium sulfate. The first and second liquid phases are separated and then zinc is electrochemically recovered from the first liquid phase. The second liquid phase is reduced to form $Mn^{2+}$ and the second liquid phase is supplied to an electrochemical cell and manganese is recovered by electrochemical means.

In another embodiment, a method for recovering zinc and manganese from a brine is provided. The method includes the steps of providing a brine that includes manganese and zinc; selectively removing silica and iron from the brine to produce a substantially silica and iron free brine that includes manganese and zinc; selectively precipitating manganese from the brine by the addition of a basic solution containing an amine or ammonia up to about pH 8 to 9; and producing a manganese precipitate with less than 0.15% Zn and 4% Ca and recovering the precipitate. In certain embodiments, the method can include the step of dissolving the precipitate in an acidic solution to recover the manganese salt. The method can also include the step of adding a reducing agent to ensure dissolution of at least about 95% of the manganese. In certain embodiments, the precipitate has less than about 4% of the Mg present.

DETAILED DESCRIPTION OF THE INVENTION

Broadly, described herein are methods for the selective removal of manganese and zinc from solution. As used herein, the selective removal of manganese and zinc generally refers to methods to facilitate the removal of manganese and zinc from solutions that include manganese and zinc, such as brines, without the removal of other ions. Generally, in certain embodiments, the methods employ chemical means for the separation of manganese and zinc from brines. In certain embodiments, the methods may include physical means, as well as chemical means, for the separation of manganese and zinc from brines.

Definitions

The term "amines" shall refer to primary, secondary, and tertiary amines, unless otherwise specified.

As used herein, "brine" or "brine solution" refers to any aqueous solution that contains a substantial amount of dissolved metals, such as alkali and/or alkaline earth metal salt(s) in water, wherein the concentration of salts can vary from trace amounts up to the point of saturation. Generally, brines suitable for the methods described herein are aqueous solutions that may include alkali metal or alkaline earth chlorides, bromides, sulfates, hydroxides, nitrates, and the like, as well as natural brines. In certain brines, metals may be present. Exemplary elements present in the brines can include sodium, potassium, calcium, magnesium, lithium, strontium, barium, iron, boron, silica, manganese, chlorine, zinc, aluminum, antimony, chromium, cobalt, copper, lead, arsenic, mercury, molybdenum, nickel, silver, thallium, vanadium, and fluorine, although it is understood that other elements and compounds may also be present. Brines can be obtained from natural sources, such as, Chilean brines or Salton Sea brines, geothermal brines, sea water, mineral brines (e.g., lithium chloride or potassium chloride brines), alkali metal salt brines, and industrial brines, for example, industrial brines recovered from ore leaching, mineral dressing, and the like. The present invention is also equally applicable to artificially prepared brine or salt solutions. Geothermal brines, such as those found in the Salton Sea, can include many dissolved metal salts, including alkaline, alkaline earth, and transition metal salts. As used herein, "brine" or "brine solution" refers to any brine including continental brine deposits, geothermal brines, and waste or byproduct streams from industrial processes.

In one embodiment, the present invention provides a method for separating manganese, as well as zinc, lead, and silver, from brines, particularly geothermal brines. In certain embodiments, the present invention utilizes the coordination chemistry of the various metals to facilitate separation thereof.

Figure 1:
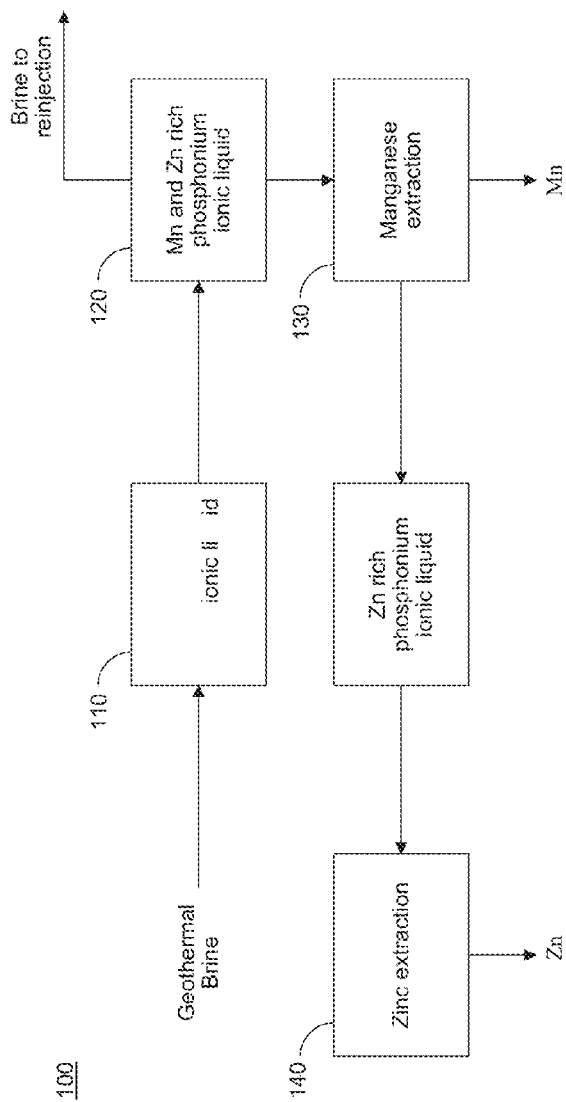
FIG. 1 illustrates a process for the recovery of manganese and zinc from a brine according to one embodiment of the invention.

As shown in FIG. 1, process 100 of the present invention first contacts a geothermal brine with an ionic liquid in step 110. In certain embodiments, the ionic liquid is a phosphonium based ionic liquid. In certain embodiments, the phosphonium based ionic liquid is trihexyl(tetradecyl) phosphonium chloride or Cyphos IL 101 (available from Cytec Industries). One method for contacting the geothermal brine with the ionic liquid is to agitate them vigorously at high heat for a required amount of time. In one embodiment, the agitation time is at least 2 minutes. In certain embodiments, agitation temperatures range between about 85-95° C., alternatively between about 90-95° C., alternatively at about 95° C. In certain embodiments, agitation times range between about 1-3 minutes and preferably between about 2-3 minutes, although it is understood that the specific agitation times depend upon various factors, such as agitation/mixing speeds, viscosity of the brine:ionic liquid mixture, and amount of heat that is applied.

In step 120, after the ionic liquid has contacted the geothermal brine for sufficient time to extract the manganese and zinc from the geothermal brine, the solutions can be separated to provide a manganese and zinc-rich ionic liquid and a manganese and zinc-depleted geothermal brine. The manganese and zinc-depleted geothermal brine can be analyzed for metal ion composition to determine if sufficient manganese and zinc have been extracted from the brine. In certain methods, the manganese and zinc-depleted geothermal brine can be analyzed using ICP mass spectrometry. In certain embodiments, if manganese and zinc have been successfully removed from the geothermal brine, the manganese and zinc depleted brine can be reinjected into the geothermal well from which it was originally removed.

After step 120, the manganese and zinc rich ionic liquid can be treated with an aqueous solution in step 130, to selectively remove manganese from the manganese and zinc-rich ionic liquid. In certain embodiments, the aqueous solution is water. In embodiments utilizing water as the aqueous solution, the water can be contacted with the manganese and zinc-rich ionic liquid at a temperature of between about 80-95° C. In alternate embodiments, the aqueous solution can be an acid. Exemplary acids can include hydrochloric acid and sulfuric acid. In certain embodiments using acid as the aqueous solution, the acid can be at a concentration of between about 0.25 and 1.25 Molar.

Following the removal of manganese from the ionic liquid in step 130, a manganese depleted, zinc-rich ionic liquid can be treated with an aqueous solution to precipitate zinc in step 140. In certain embodiments, the aqueous solution is water. In certain embodiments, the pH of the water can be adjusted using a base until the pH of the water is between about 6 and 8.

Figure 2:
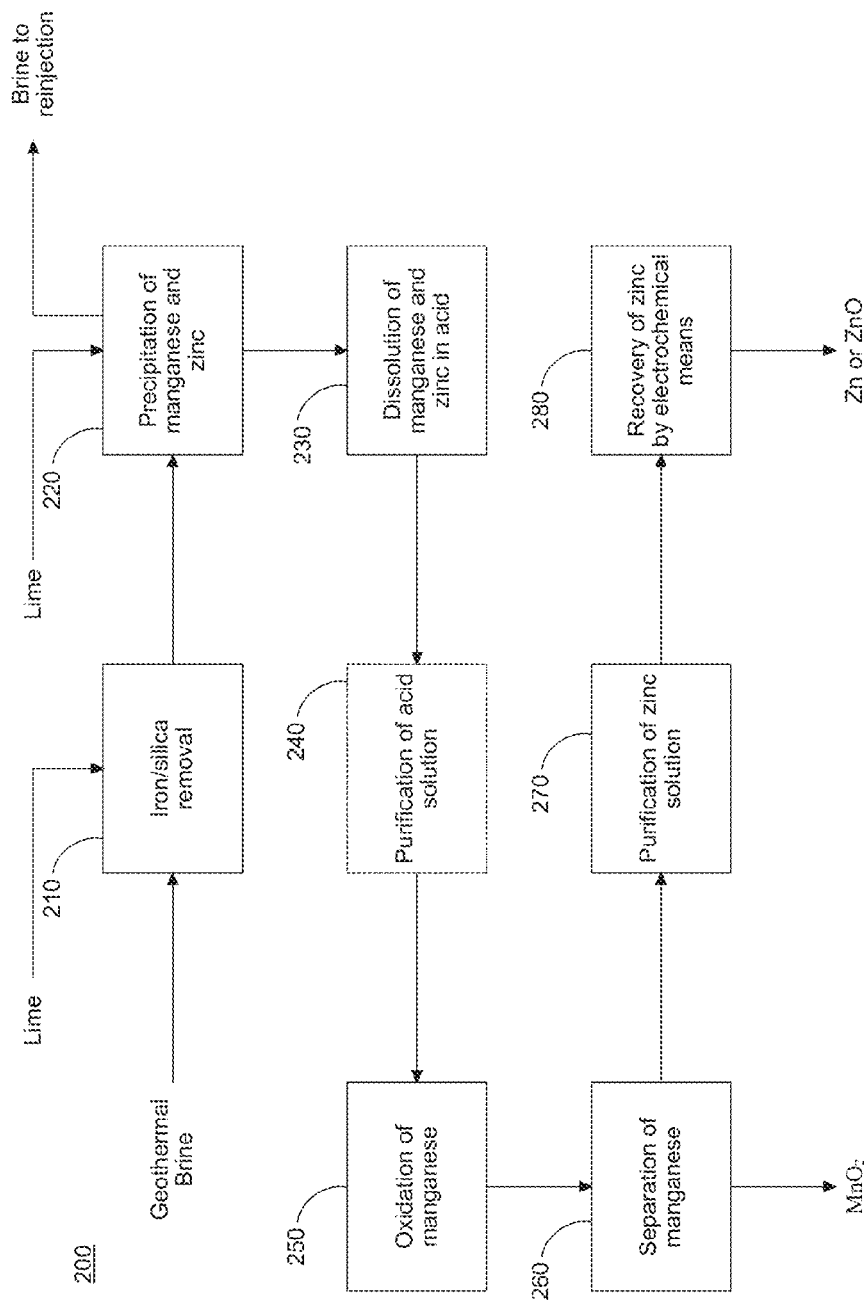
FIG. 2 illustrates another process for the recovery of manganese and zinc from a geothermal brine according to another embodiment of the invention.

As shown in FIG. 2, process 200 of the present invention first removes silica and iron from the brine solution in an iron/silica removal step 210. In certain embodiments, the iron and silica removal step preferably removes only the iron and silica, while at the same time leaving all other metals and/or ions present in the brine undisturbed. The removal of silica is an important step as the presence of silica can interfere with subsequent processes for the recovery of various other metals. For example, silica frequently clogs pores in filtration media.

One preferred method for the selective removal of silica and iron includes contacting the solution with iron (III) hydroxide at a pH of between about 4.5 and 6, preferably between about 4.75 and 5.5, more preferably between about 4.9 and 5.3.

Typically, brine will have an iron (II) salt present naturally. In other embodiments, an iron (II) salt or iron (III) hydroxide can be added to the brine to achieve a certain concentration of iron (II) salt or iron (III) hydroxide relative to the silica or silicon containing compounds present in the brine. In certain embodiments, the molar ratio of the iron (II) salt or iron (III) hydroxide to silica is at least 1:1, preferably at least 4:1, more preferably at least 7:1 and even more preferably at least 10:1.

When the iron in the brine or silica containing solution is iron (II), for example iron (II) chloride, an oxidant is added to oxidize iron (II) salt to iron (III) hydroxide. The preferred oxidant is air. Thus, in one preferred embodiment, the iron (II) salt present in the brine can be oxidized to iron (III) by sparging the reaction vessel with air. While it is understood that many different oxidants can be used for the oxidation of iron (II) to iron (III), the use of oxygen or air as the oxidant in the pH range of between 4 and 7 is selective for the oxidation of the iron (II) salt to iron (III) hydroxide, and generally does not result in the precipitation or oxidation of other elements or compounds that are present in the brine. Control of the pH of the solution can be achieved with the addition of base (e.g., calcium hydroxide, calcium oxide or the like). As noted previously, it is preferred that the pH is maintained between 4.5 and 6.

Other exemplary oxidants can include hypohalite compounds, such as hypochlorite, hydrogen peroxide (in the presence of an acid), air, halogens, chlorine dioxide, chlorite, chlorate, perchlorate and other analogous halogen compounds, permanganate salts, chromium compounds, such as chromic and dichromic acids, chromium trioxide, pyridinium chlorochromate (PCC), chromate and dichromate compounds, sulfoxides, persulfuric acid, nitric acid, ozone, and the like. It will be recognized by those skilled in the art that iron (III) hydroxide may also have a significant affinity for arsenic (III) and (V) oxyanions, and these anions, if present in the brine, may be co-deposited with the silica on the iron (III) hydroxide.

In another embodiment, iron (III) hydroxide can be produced by adding a solution of iron (III) chloride to the brine, which on contact with the more neutral brine solution, will precipitate as iron (III) hydroxide. The brine may require neutralization, such as through the addition of base to initiate precipitation of the iron (III) hydroxide.

The iron (III) hydroxide contacts the silica present in the brine and forms a precipitate. Without being bound to any specific theory, it is believed that the silica or silicon containing compound attaches to the iron (III) hydroxide. In certain embodiments, the ratio of iron (III) to silica is at least about 1:1, more preferably at least about 4:1. The reaction of the iron (III) hydroxide with silica is capable of removing at least about 80% of the silica present, preferably at least about 90%, and more preferably at least about 95%, and typically depends upon the amount of iron (III) hydroxide present in the solution.

In certain embodiments, the iron (II) salt containing solution can be sparged with air for a period of at least 15 min., preferably at least 30 min., followed by the addition of a base, such as calcium oxide, calcium hydroxide, sodium hydroxide, or the like, to achieve the desired pH for the solution.

After silica and iron removal step 210, in precipitation step 220, a base (e.g., calcium oxide, calcium hydroxide or the like) is added to the brine to adjust or maintain a pH of the brine at greater than at least about 6, alternatively between about 6 and 8.5, alternatively between about 6.5 and 8, alternatively between about 6.5 and 7.5. In alternate embodiments, the pH is maintained at about 7. In certain embodiments, the pH is maintained at less than about 9. The base may be in solution or slurry form. Furthermore, the solution is exposed to an oxygen source and manganese and zinc precipitates are formed. In certain embodiments, depending upon the pH of the solution, a lead precipitate may also be formed. To achieve oxidation of the manganese, air is preferably supplied to the solution by sparging or bubbling. Other oxidants suitable for the oxidation of the manganese can include hypohalites, hydrogen peroxide, and ozone. In certain embodiments wherein sodium hydroxide or ammonia is utilized as the base, reduced amounts of calcium and magnesium impurities are present in the precipitates. For example, in certain embodiments, magnesium concentration in the zinc and manganese precipitates is less than about 200 ppm, alternatively less than about 150 ppm, alternatively less than about 100 ppm. Similarly, the concentration of calcium in the zinc and manganese precipitates is less than about 450 ppm, alternatively less than about 400 ppm, alternatively less than about 350 ppm, alternatively less than about 300 ppm, alternatively less than about 250 ppm, alternatively less than about 200 ppm.

The solids in the brine and base, which solids can include at least manganese and zinc, are separated from the remainder of the mixture, which retains the majority of ions present in the brine. Separation of the solids can be done by conventional filtration means and can optionally include centrifugation or other known techniques for concentration the solids. In certain embodiments, the remaining brine solution from which the manganese and zinc have been removed can then be reinjected into the geothermal well from which the brine was originally removed.

In certain embodiments, the preferential precipitation of zinc and manganese from the brine solution results in the precipitation of at least about 80% of the zinc and manganese present in solution, alternatively at least about 85%, alternatively at least about 90%, alternatively at least about 95%. Similarly, the preferential precipitation results in the precipitation of no more than about 10% of other ions present in the brine solution, alternatively less than about 8%, alternatively less than about 6%, alternatively less than about 5%, alternatively less than about 3%.

The manganese and zinc solids that are separated from the remaining brine solution can then be dissolved in an acid solution in step 230. Preferred acids include strong mineral acids, such as hydrochloric acid, sulfuric acid, methanesulfonic acid, and the like. The use of hydrochloric acid results in the production of zinc chloride and manganese chloride. Similarly, the use of sulfuric acid results in the production of zinc sulfate and manganese sulfate. In certain embodiments, lead and/or calcium precipitates may be formed during the precipitation of the manganese and zinc. In these embodiments, the selected acid is preferably sulfuric acid, as sulfuric acid is selective for manganese and zinc precipitates, and does not dissolve the lead and/or calcium precipitates that may be present. The acid is preferably added to the solids in greater than approximately a 1:1 molar ratio to the solids. In certain embodiments, it may be beneficial to minimize the amount of excess acid that is utilized for dissolving the manganese and zinc precipitates, for ease of performance of downstream processes, as well as for economic and environmental considerations. In certain embodiments, the solids and acid are mixed to ensure complete dissolution of the solids.

The acid and dissolved metal solution is then filtered to remove remaining solids, if any, and the solution may then be purified in optional purification step 240 to remove trace metals, which may be present in the acidified solution. It is believed that metals, such as copper, cadmium, nickel, antimony and/or cobalt, as well as other metals or ions, may be present in trace amounts in the acid and dissolved metal solution. These trace metals may interfere with the subsequent separation of manganese and zinc. Purification of the acid and dissolved metal solution can be achieved by known means, such as ion exchange or by treatment with zinc dust. Zinc dust operates by first displacing other more noble metals from solution and allowing them to precipitate on undissolved zinc dust. For example, copper ions present in the solution will precipitate as copper metal or will deposit on undissolved zinc dust.

Manganese and zinc can be extracted from the acid and dissolved metal solution using solvent extraction techniques. Suitable solvents for the extraction of manganese and zinc include phosphines, phosphoric acids, and phosphinic acids, such as the following: di(2-ethylhexyl)phosphoric acid (DEHPA) in kerosene or Cyanex® 272 (bis(2,4,4-trimethylpentyl)phosphinic acid); Ionquest 290 (available form Rhodia Inc.) in aliphatic kerosene or the highly branched carboxylic acid extractant (versatic 10)(10-decyl-4-pyridinecarboxylate). In certain embodiments, DEHPA is a suitable extraction solvent, particularly in embodiments where iron has been previously removed. In certain embodiments, manganese and zinc can be extracted with organic amines, such as 1,4-diazabicyclo[2.2.2]octane (DABCO), 2,2'-bipyridyl and piperazine. In certain embodiments, zinc can be preferentially extracted with a functionalized amine, such as polyvinyl pyrrolidone.

Other exemplary solvents that may be used for the extraction of zinc are discussed in U.S. Pat. No. 5,135,652, the disclosure of which is herein incorporated by reference in its entirety. These exemplary solvents include mono-2-ethylhexylphosphoric acid (M2EHPA), di-2-ethylhexylphosphoric acid (D2EHPA), and mixtures thereof (EHPA). Other exemplary solvents include bis-2,4,4-trimethylpentylmonothiophosphinic acid (Cyanex® 302) and bis-2,4,4-trimethylpentyldithiophosphinic acid (Cyanex® 301). In certain embodiments, the extractant includes both phosphoric acid and phosphinic acid. In certain embodiments, the ratio of phosphoric acid to phosphinic acid is greater than about 1:1, preferably between about 1:1 and 1:6. In certain embodiments, the extractant can be diluted with a hydrocarbon solvent, preferably a dearomatized aliphatic hydrocarbon. Exemplary diluents include Exxsol™ D80.

The pH during the extraction is maintained at less than about 7, alternatively between about 1 and 5, alternatively between about 1 and 3, alternatively in the range of about 1.5 to 3.5, alternatively between about 2 and 4.

Other solvents suitable for the extraction of zinc from brine solutions are described in "Recovery of Zinc(II) from Acidic Sulfate Solutions. Simulation of Counter-Current Extraction Stripping Process", Gotfryd, L. and Szymanowski, J.; Physicochemical Problems of Mineral Processing, vol. 38 (2004), pp. 113-120; "New Developments in the Boleo Copper-Cobalt-Zinc-Manganese Project", Dreisinger, et al.; available at http://bajamining.com/$_{13}$ resources/Reports/alta$_{13}$ paper$_{13}$ 2006$_{13}$ boleo$_{13}$ final.pdf; "Zinc Solvent Extraction in the Process Industries", Cole, P. and Sole, K.; Mineral Processing and Extractive Metallurgy Review, vol. 24, no. 2 (2003), pp. 91-137; "Solvent extraction of zinc(II) and manganese(II) with 5,10,15,20-tetraphenyl-21H,23H-porphine(TPP) through the metal exchange reaction of lead(II)-TPP", Kawai, T., Fujiyoshi, R., and Sawamura, S.; Solvent Extr. Res. Dev. Japan, vol. 7 (2000), pp. 36-43, "Solvent Extraction of Zinc from Strong Hydrochloric Acid Solution with Alamine336", Lee, M. and Nam, S.; Bull. Korean Chem. Soc., vol. 30, no. 7 (2009), pp. 1526-1530, the disclosures of which are incorporated herein by reference.

Manganese can be isolated by electrolysis or, in step 250, by oxidation to produce manganese dioxide, or by precipitation as a carbonate by reaction with sodium carbonate. In certain preferred embodiments, manganese can be selectively isolated from zinc as manganese dioxide by electrolysis in a sulfate solution, at an anode made of metals, such as titanium or carbon. Alternatively, selective oxidation of manganese to manganese dioxide can be achieved utilizing an oxidant, such as chlorine, hydrogen peroxide, or the like to provide solid manganese dioxide and zinc containing solution. In step 260, precipitated manganese dioxide is separated from the zinc containing solution by known means, such as filtration, centrifugation, or a like process.

In an alternate embodiments, manganese dioxide can be generated at the anode of a divided electrochemical cell by the oxidation of manganese (II) and manganese (III) to generate a manganese dioxide deposited on the surface of the electrode. After the solution is passed through anode compartment, it is then fed to the cathode compartment where zinc metal is electrodeposited. The current density ranges from between about 50 to about 500 A/m$^2$. The separator, such as an ion exchange membrane or a porous material that allows the passage of liquids, positioned between the anode and cathode assists in preventing deposition of manganese dioxide on the zinc metal. In certain embodiments, the separator can include a series of baffles. In certain embodiments, it may be advantageous to remove solid manganese dioxide from the electrolytic stream formed in the anode compartment that may be lost from the surface of the anode, such as by filtration, prior to supplying to the cathode compartment. Production of manganese dioxide by electrochemical means and the recovery of zinc metal by electrowinning preferably includes a conductive solution, such as sulfate, chloride, methanesulfonate, or the like, for improved efficiency. In certain embodiments, it is preferred that the electrochemical cell includes a small amount of free acid in the solution. In alternate embodiments, the electrochemical cell can be operated at a pH ranging from about 0 to 2. Following recovery of the manganese and zinc, the respective solutions can be recycled to the solvent extraction step. Alternatively, the respective solutions can be recycled to the acid solution.

The zinc containing solution can then be optionally purified in step 270 and then supplied to an electrochemical cell for electrochemical recovery in step 280 by electrowinning (also known as electroextraction). Electrowinning utilizes an electrochemical cell wherein a current is passed from an inert anode, such as lead dioxide, iridium dioxide coated titanium, or other stable substrate, through the zinc containing solution, leading to deposition of the zinc on the cathode. The base cathode can be aluminum, although other metals, such as steel, stainless steel, and titanium, can also be used. The cathode material is selected based upon chemical stability, electrical conductivity, and the ease of removal of zinc from substrate.

Alternatively, in the process illustrated by FIG. 2, the steps for the isolation and recovery of manganese and zinc can be reversed, i.e., the zinc can be separated and isolated from a solution that includes zinc and manganese by electrowinning, followed by the isolation of manganese by either electrowinning or oxidation of the manganese to produce manganese dioxide.

Optionally, the process may include a step for the recovery of lithium from the geothermal brine. Methods for the recovery are known in the art, such as is described in U.S. Pat. Nos. 4,116,856; 4,116,858; 4,159,311; 4,221,767; 4,291,001; 4,347,327; 4,348,295; 4,348,296; 4,348,297; 4,376,100; 4,430,311; 4,461,714; 4,472,362; 4,540,509; 4,727,167; 5,389,349; 5,599,516; 6,017,500; 6,280,693; and 6,555,078, each of which is incorporated herein by reference in their entirety. Alternatively, methods can be employed utilizing a lithium aluminate intercalate/gibbsite composite material, a resin based lithium aluminate intercalate, and/or a granulated lithium aluminate intercalate. The gibbsite composite is a lithium aluminate intercalate that is grown onto an aluminum trihidrate core. The resin-based lithium aluminate intercalate is formed within the pores of a macroreticular ion exchange resin. The granulated lithium aluminate intercalate consists of fine-grained lithium aluminate intercalate produced by the incorporation of a small amount of inorganic polymer. The process of contacting the lithium aluminate intercalate material with the geothermal brine is typically carried out in a column that includes the extraction material. The geothermal brine is flowed into the column and lithium ions are captured on the extraction material, while the water and other ions pass through the column. After the column is saturated, the captured lithium is removed by flowing water having a small amount of lithium chloride present through the column. In preferred embodiments, multiple columns are employed for the capture of the lithium.

Figure 3:
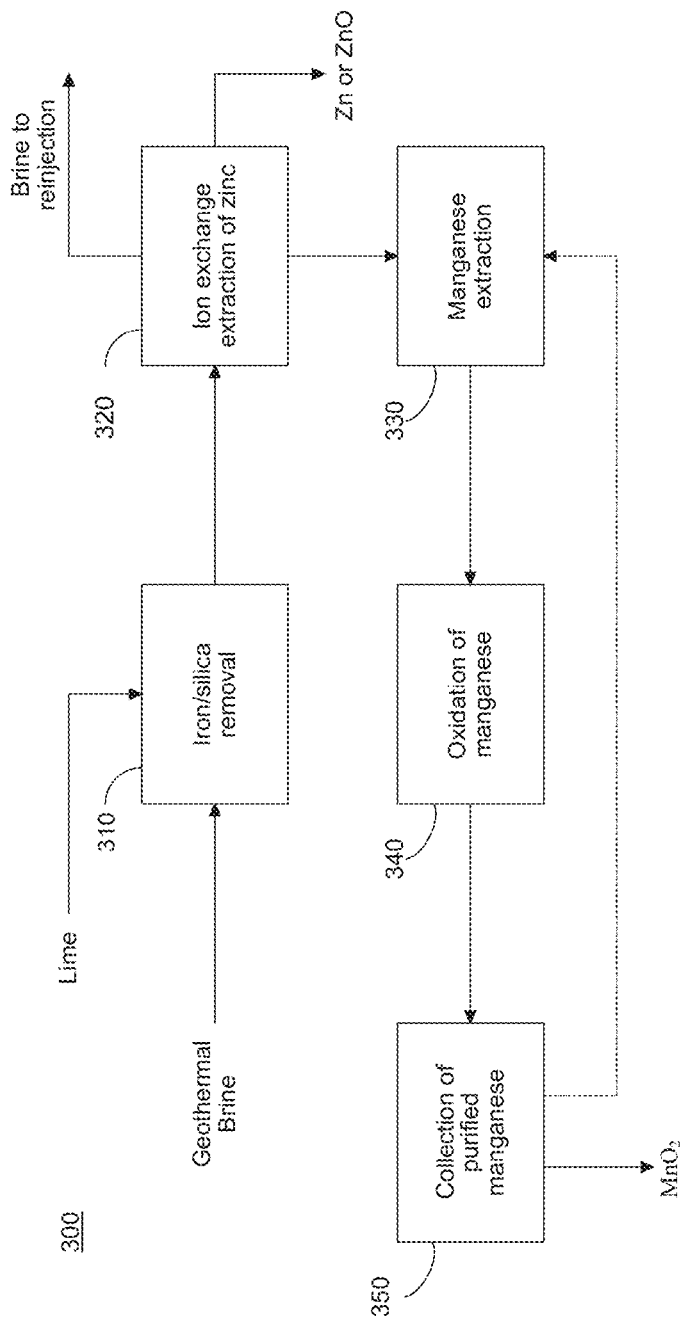
FIG. 3 illustrates another process for the recovery of manganese and zinc from a geothermal brine according to another embodiment of the invention.

In another embodiment of the present invention, in process 300 provided in FIG. 3, iron and silica are first removed from the geothermal brine in step 310. Methods for the removal of silica and iron include those methods previously described with respect to FIG. 1, and preferably include oxidation of the iron from iron (II) to iron (III), and the control of the pH of the solution with the addition of a base. Preferably, the iron is oxidized with air, and the pH is controlled by the addition of a base, such as calcium oxide or calcium hydroxide, or like compound.

The brine solution, now having a reduced concentration of silica and iron relative to the initial brine feed, can be supplied to zinc removal process 320 that can include an ion exchange process, for example a basic anionic ion exchange resin like the chloride of a quaternary amine divinylbenzene/stryene copolymer, or the chloride of trimethylamine functionalized chloromethylated copolymer of styrene and divinylbenzene, such as is described in U.S. Pat. No. 6,458,184, which is incorporated herein by reference in its entirety. Zinc separated by ion exchange, existing as zinc chloride or a zinc chloride anions, can then be converted into a saleable zinc product, such as zinc metal, zinc oxide, or zinc sulfate. In certain embodiments, the remaining brine solution from which the manganese and zinc have been removed can then be reinjected into the geothermal well from which the brine was originally removed.

The remaining solution, which includes manganese, can then optionally be supplied to purification step 330 and purified by ion exchange, solvent extraction, or like process, and the manganese containing phase can be provided to oxidation step 340, such as an electrochemical cell or chemical oxidation process, as described with respect to FIG. 2, to facilitate the recovery of manganese dioxide. Purified manganese can be collected in step 350 by filtration. As shown with the dashed line, the liquid phase from step 350 can optionally be recycled to manganese extraction step 330. As previously discussed, following recovery of the manganese and zinc, the respective solutions can be recycled to the solvent extraction step. Alternatively, the respective solutions can be recycled to the acid solution.

As noted with respect to FIG. 2, in process 300 the lithium can optionally be removed from the brine solution at any point during the process by the means discussed above.

Figure 4:
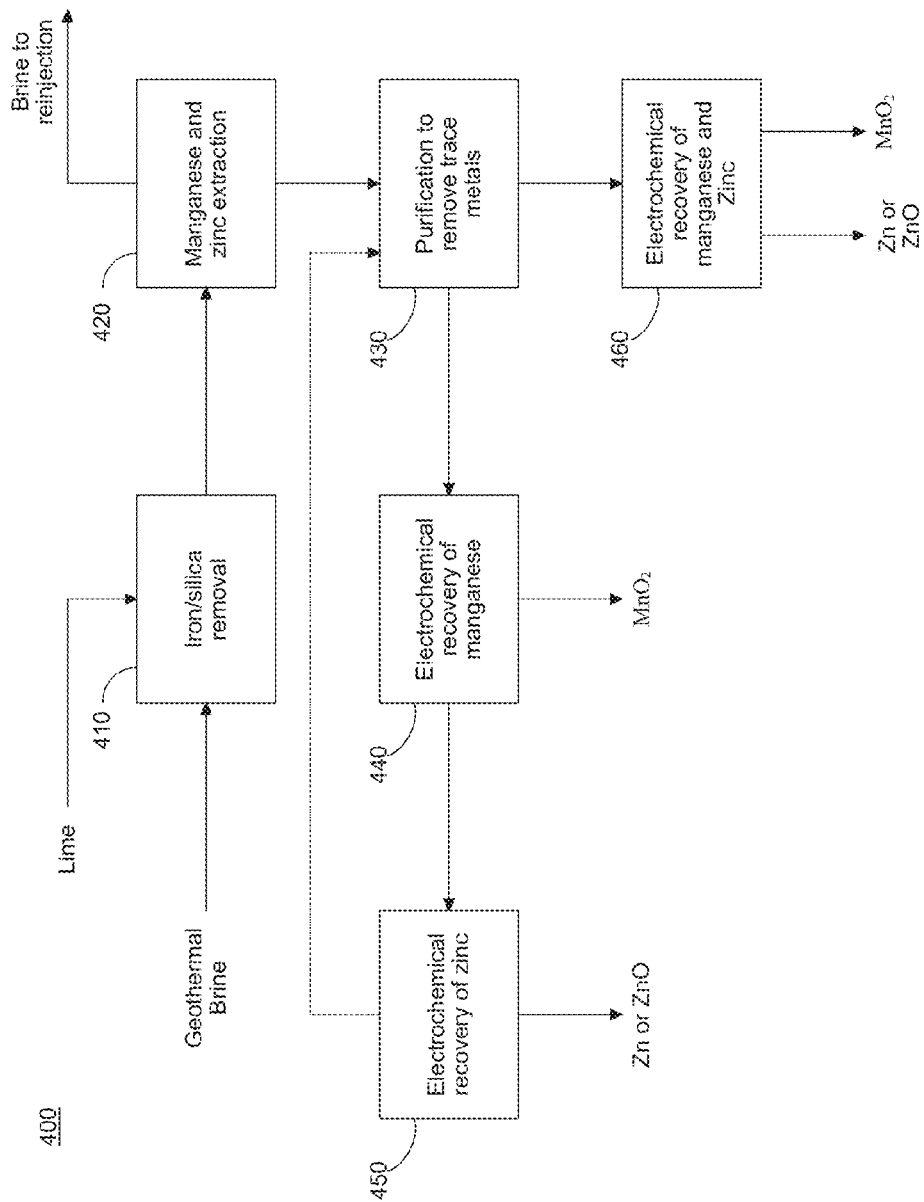
FIG. 4 illustrates another process for the recovery of manganese and zinc from a geothermal brine according to another embodiment of the invention.

In yet another embodiment, in process 400 shown in FIG. 4, a method for the separation and isolation of manganese and zinc from a brine is provided. As noted with respect to FIGS. 2 and 3, the first step of the process includes the removal of iron and silica from the brine solution in step 410. Preferably, as discussed above, the iron is oxidized and base is added to the solution to control the pH. Preferably, iron is oxidized with air, and the base is calcium oxide, calcium hydroxide, or a like compound.

Following removal of a major portion of the silica and iron, the manganese and zinc can be removed by liquid-liquid extraction step 420. Exemplary liquids suitable for the extraction of manganese and zinc are described in U.S. Pat. No. 6,458,184 and U.S. Pub. Pat. App. No. 20030226761, the disclosures of which are incorporated herein by reference in their entirety. The solvents can include, for example, water-immiscible cationic organic solvents, such as di-(2-ethylhexyl)phosphoric acid (D2EHPA), and other similar solvents, as known in the art. In certain embodiments, the remaining brine solution from extraction step 420, from which the manganese and zinc have been removed, can then be reinjected into the geothermal well from which the brine was originally removed.

Following the liquid-liquid extraction step, the extraction solution that includes the manganese and zinc can be provided to one or more purification steps 430. Purification steps 430 preferably operable to remove calcium and other divalent cations, as well as some metals, such as copper, cadmium, cobalt, molybdenum, and nickel, although the purification steps are not limited to these metals.

Following purification step 430, the manganese and zinc can be isolated in steps 440 and 450, respectively. Specifically, as previously discussed, manganese dioxide and zinc can each separately be produced from solution by electrowinning. In one embodiment, zinc is recovered first, followed by manganese. In an alternate embodiment, manganese is recovered first, followed by zinc. In certain embodiments, the pH is maintained at less than about 3.5 during the electrowinning process. In alternate embodiments, the temperature is maintained at less than about 60° C. during the electrowinning process. In certain embodiments, the pH of the solution supplied to manganese electrochemical recovery step 440 is about 5, and the pH of the solution exiting the electrochemical cell is about 1. The pH of the solution supplied to zinc electrochemical recovery step 450 is about 1.

In an alternate embodiment, the solution from purification step 430 can be supplied to a single electrochemical recovery step 460 wherein zinc and manganese can be deposited simultaneously as zinc oxide and manganese dioxide.

As previously discussed, following recovery of the manganese and zinc, the respective solutions can be recycled to either the solvent extraction step or to the acid solution. In certain embodiments, as shown by the dashed line, the solution from zinc electrochemical recovery step 450 can be recycled to purification step 430.

Figure 5:
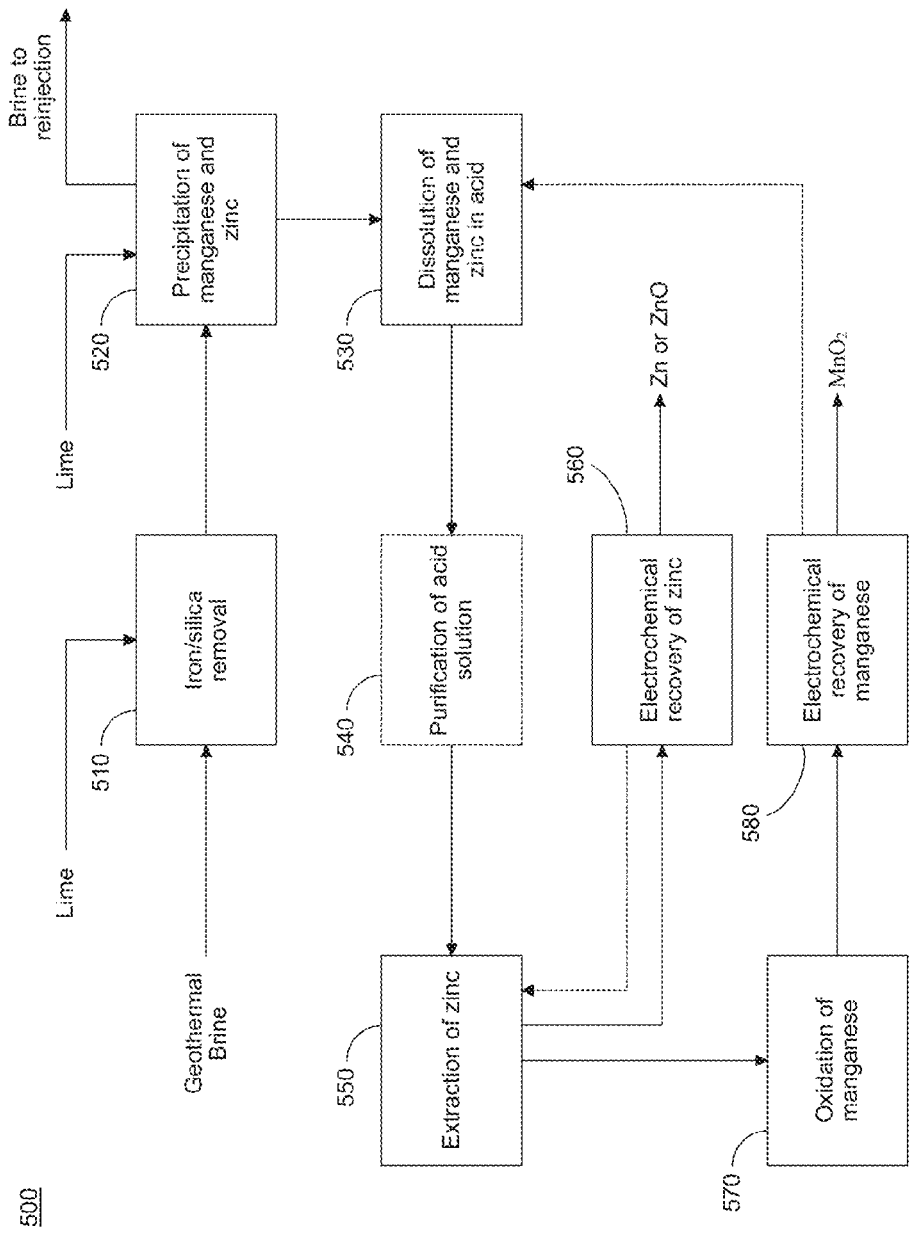
FIG. 5 illustrates another process for the recovery of manganese and zinc from a geothermal brine according to another embodiment of the invention.

In another embodiment, as provided in FIG. 5, process 500 for the recovery of manganese or zinc from a geothermal brine is provided. As previously discussed, with respect to FIG. 2, first step 510 of process 500 includes the removal of iron and silica from the brine solution. In certain embodiments, the iron is oxidized and base is added to control the pH of the solution. In certain embodiments, iron is oxidized with air and the base is calcium oxide or calcium hydroxide, or like compound.

Following the removal of the iron and silica, in precipitation step 520, additional base, such as lime, slaked lime, limestone, sodium hydroxide, and the like, is added to achieve a pH of between about 6 and 9, preferably up to about 8 when sparged with air, or up to about 9 when it is not sparged with air, to facilitate the precipitation of manganese and zinc. The manganese and zinc precipitates are collected by known means and dissolved in an acid solution in step 530, as previously discussed herein. In certain embodiments, the remaining brine solution from extraction step 520, from which the manganese and zinc have been removed, can then be reinjected into the geothermal well from which the brine was originally removed.

Optionally, the acid solution, which includes the manganese and zinc, can be purified in step 540, to remove trace metal impurities, such as heavy metals, for example, cobalt, copper, cadmium, nickel, and the like. The acid solution is then extracted in step 550 to recover zinc, as previously provided. Thus, following extraction, a first solution, which includes zinc and the extraction solvent, is produced and a second solution, which includes manganese, is produced.

The zinc can then be recovered by electrochemical means in step 560, such as by electrowinning or a like process, as previously discussed. Manganese can be recovered by first oxidizing the manganese in step 570 to produce manganese dioxide, as previously discussed, which can then be recovered electrochemically in step 580 by known means. As previously discussed, as shown by the dashed lines, following recovery of the manganese and zinc, the solutions from steps 560 and 580 can be recycled to solvent extraction step 550 or to the acid solution of dissolution step 530, respectively.

Figure 6:
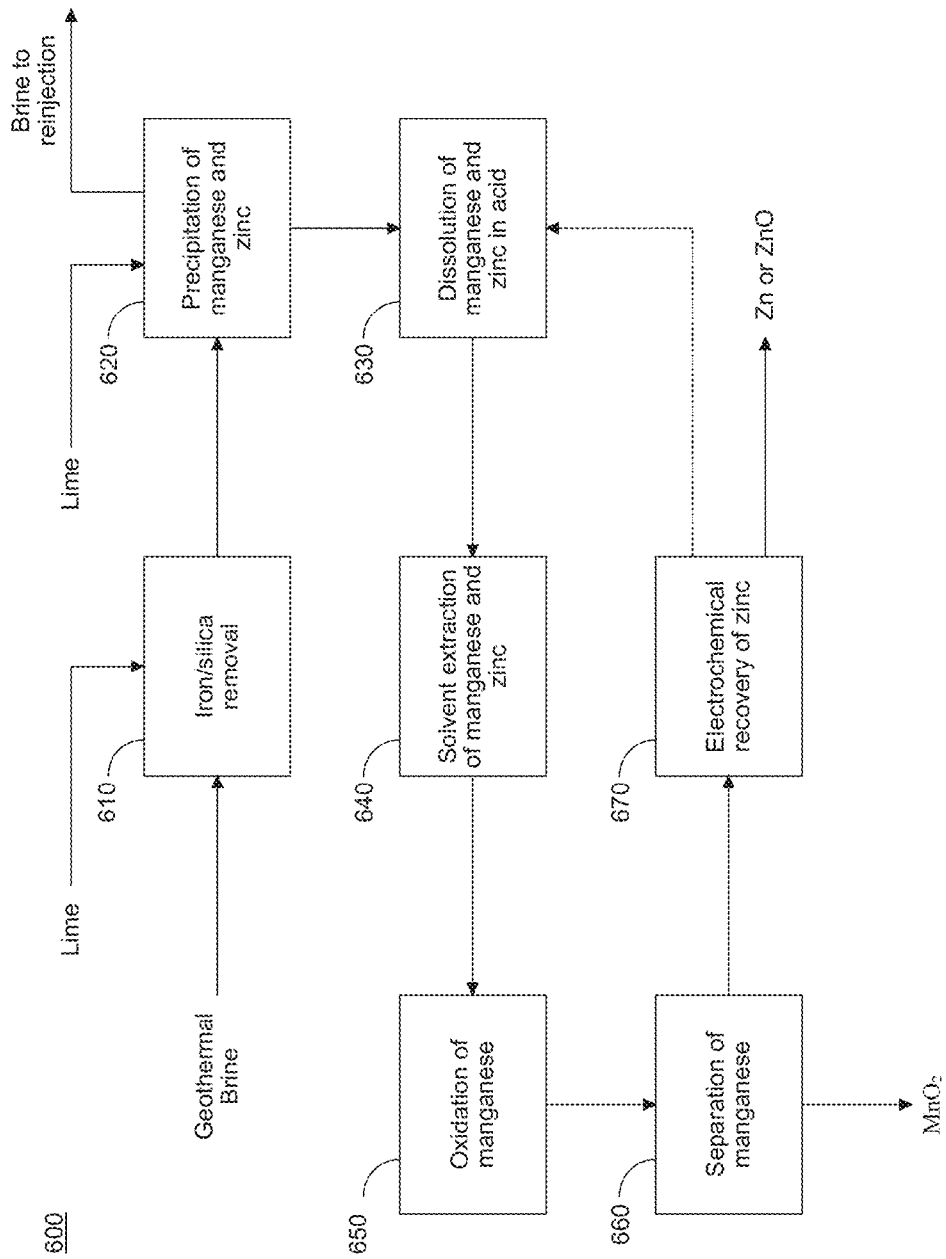
FIG. 6 illustrates another process for the recovery of manganese and zinc from a geothermal brine according to another embodiment of the invention.

In another embodiment, as provided in FIG. 6, process 600 for the recovery of manganese or zinc from a geothermal brine is provided. As previously discussed, first step 610 of the process includes the removal of iron and silica from the brine solution. In certain embodiments, the iron is oxidized and base is added to control the pH of the solution. In certain embodiments, iron is oxidized with air and the base is calcium oxide or calcium hydroxide.

Following the removal of the iron and silica, in precipitation step 620, additional base to adjust the pH to at least about 6 is added to facilitate the precipitation of manganese and zinc. The manganese and zinc precipitates are collected by known means, such as by filtration, centrifugation, or a like process, and dissolved in an acid solution in step 630, as previously discussed herein. Optionally, the acid solution, which includes the manganese and zinc, can be purified. In certain embodiments, the remaining brine solution from extraction step 620, from which the manganese and zinc have been removed, can then be reinjected into the geothermal well from which the brine was originally removed.

The acid solution from step 630 can then be extracted in extraction step 640 to recover manganese and zinc, as previously provided, to provide an extract solution that includes both manganese and zinc. The manganese in the extract solution can be oxidized in step 650 to produce manganese dioxide, which can then be separated by filtration or other known means in step 660. Zinc remaining in the extract solution can then be recovered in step 670 by electrochemical means, such as electrowinning or a like process. In certain embodiments, as shown by the dashed line, the solution from zinc electrochemical recovery step 670 can be recycled to the dissolution step 630.

Figure 7:
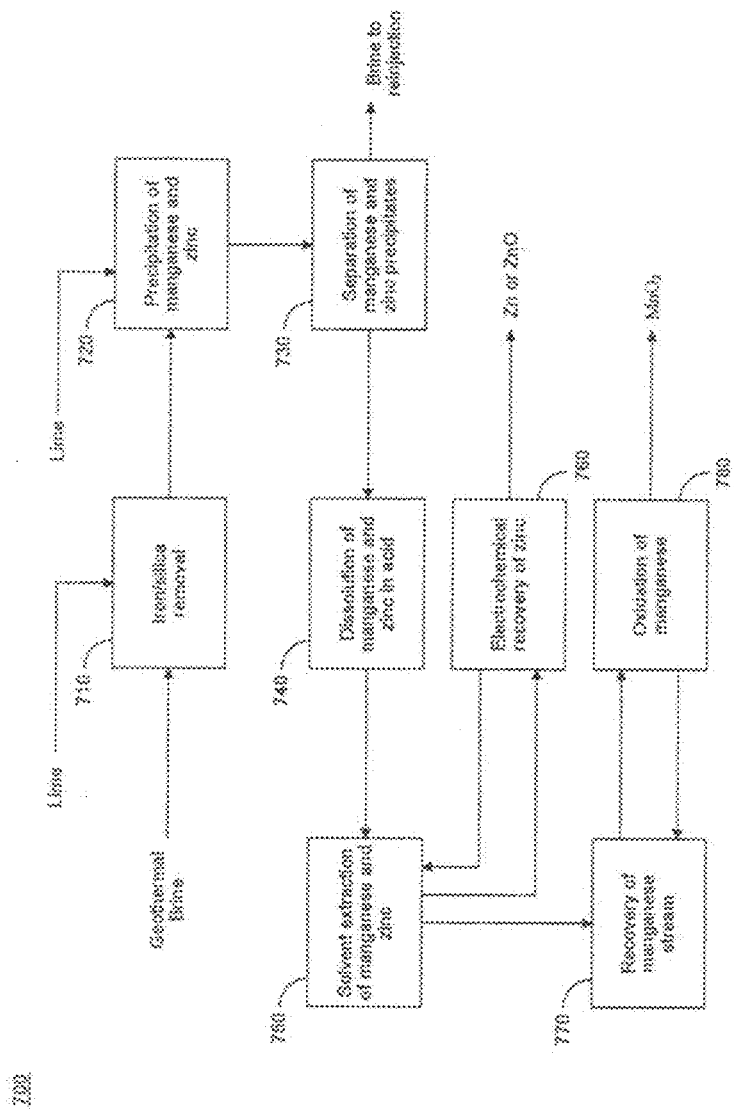
FIG. 7 illustrates another process for the recovery of manganese and zinc from a geothermal brine according to another embodiment of the invention.

In another embodiment, as provided in FIG. 7, process 700 for the recovery of manganese or zinc from a geothermal brine is provided. As previously discussed, first step 710 of the process includes the removal of iron and silica from the brine solution. In certain embodiments, the iron is oxidized and base is added to control the pH of the solution, preferably to at least about 5 and up to about 6. In certain embodiments, iron is oxidized with air and the base is calcium oxide or calcium hydroxide.

Following the removal of the iron and silica, in precipitation step 720, additional base is added to achieve a pH of at least about 6 to cause the precipitation of manganese and zinc. The manganese and zinc precipitates are collected by known means in step 730 and dissolved in an acid solution in step 740, as previously discussed herein. Optionally, the acid solution, which includes the manganese and zinc, can be purified. In certain embodiments, the remaining brine solution from extraction step 730, from which the manganese and zinc have been removed, can then be reinjected into the geothermal well from which the brine was originally removed.

The acid solution from step 740 is then subjected to a double extraction step 750, wherein the acid solution is contacted with two separate extraction solvents to recover two separate streams, wherein recovery step 770 recovers a first stream that includes manganese and a second stream is recovered includes zinc. Appropriate extraction solvents for the extraction of manganese and zinc have been previously discussed. The manganese in the first stream can be oxidized in oxidation step 780 to produce manganese dioxide, which is then separated by filtration or other known means. The zinc in the second stream can be recovered by electrochemical means, such as electrowinning, in step 760. As previously discussed, as shown by the dashed lines, following recovery of the zinc and manganese in steps 760 and 780, the respective solutions can be recycled to solvent extraction step 750 or to manganese stream recovery step 770, respectively.

Figure 8:
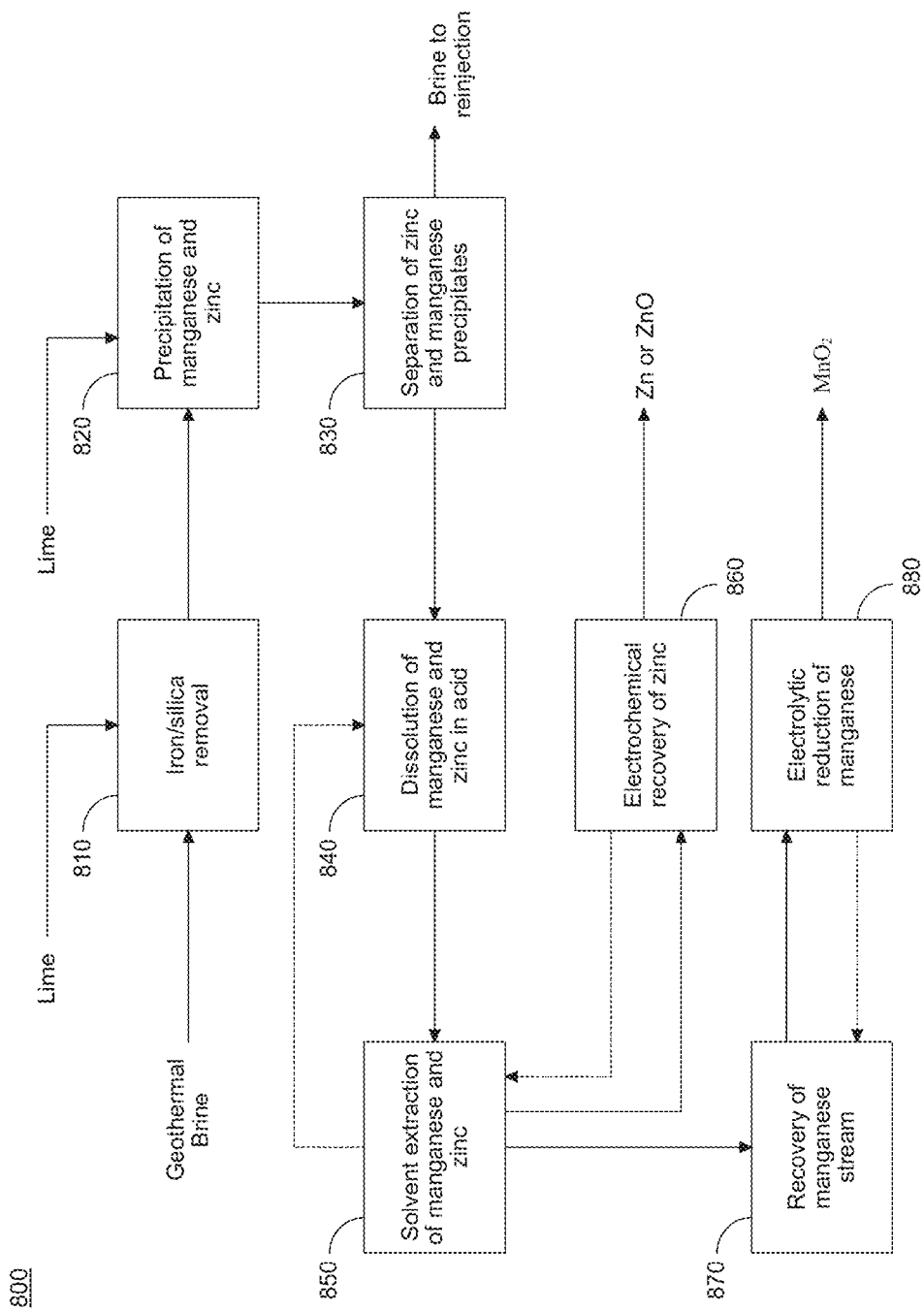
FIG. 8 illustrates another process for the recovery of manganese and zinc from a geothermal brine according to another embodiment of the invention.

In another embodiment, as provided in FIG. 8, process 800 for the recovery of manganese or zinc from a geothermal brine is provided. As previously discussed, a first step 810 of the process 800 includes the removal of iron and silica from the brine solution. In certain embodiments, the iron is oxidized and base is added to control the pH of the solution to about 5 and 6. In certain embodiments, iron is oxidized with air and the base is calcium oxide or calcium hydroxide.

Following the removal of the iron and silica, in precipitation step 820, additional base is added to achieve a pH of between about 6 and 9, preferably up to about 8 when sparged with air, or up to about 9 when it is not sparged with air, to facilitate the precipitation of manganese and zinc. The manganese and zinc precipitates are separated from a liquid phase in step 830, collected by known means, such as filtration, centrifugation or a like process, and dissolved in an acid solution in step 840, as previously discussed herein. Optionally, the acid solution, which includes the manganese and zinc, can be purified. In certain embodiments, the remaining brine solution from extraction step 830, from which the manganese and zinc have been removed, can then be reinjected into the geothermal well from which the brine was originally removed.

The acid solution from step 840 is then subjected to double extraction step 850, wherein the acid solution is contacted with two separate extraction solvents to recover two separate streams, wherein the first stream recovered in step 870 includes manganese, and wherein the second stream includes zinc. Appropriate extraction solvents for the extraction of manganese and zinc have been previously discussed. The manganese in the first stream can be electrolytically reduced in step 880, as is known in the art, to produce manganese metal. The zinc in the second stream can be recovered by electrochemical means in step 860, such as by electrowinning or a like process. As previously discussed, as shown by the dashed line, following recovery of the zinc and manganese in steps 860 and 880, the respective solutions can be recycled to the solvent extraction step 850 or to manganese stream recovery step 870, respectively. In certain embodiments, as shown by the dashed line, at least a portion of the non-extraction solvent solution from extraction step 850 can be recycled to dissolution step 840.

Figure 9:
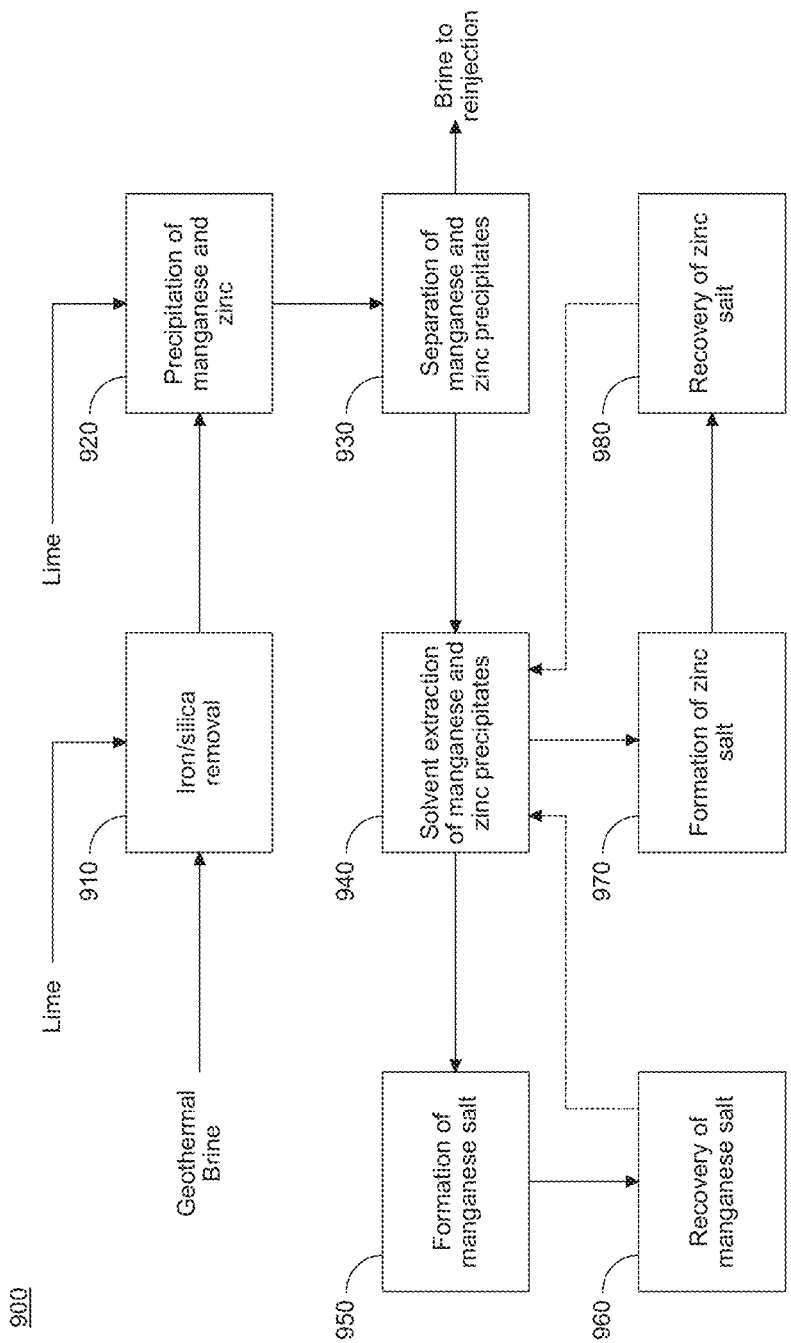
FIG. 9 illustrates another process for the recovery of manganese and zinc from a geothermal brine according to another embodiment of the invention.

In another embodiment, as provided in FIG. 9, process 900 for the recovery of manganese or zinc from a geothermal brine is provided. As previously discussed, a first step 910 of the process 900 includes the removal of iron and silica from the brine solution. In certain embodiments, the iron is oxidized and base is added to control the pH of the solution to between about 4.5 and 6, preferably between about 4.75 and 5.5. In certain embodiments, iron is oxidized with air and the base is calcium oxide or calcium hydroxide.

Following the removal of the iron and silica, in precipitation step 920, additional base is added to achieve a pH of between about 6 and 9, preferably up to about 8 when sparged with air, or up to about 9 when it is not sparged with air, to facilitate the precipitation of manganese and zinc. The manganese and zinc precipitates are separated and collected by known means in step 930, such as by filtration, centrifugation or a like process, and dissolved in an acid solution, as previously discussed herein. Optionally, the acid solution that includes the manganese and zinc can be purified. In certain embodiments, the remaining brine solution from extraction step 930, from which the manganese and zinc have been removed, can then be reinjected into the geothermal well from which the brine was originally removed.

The acid solution is then subjected to a double extraction in step 940, wherein the acid solution is contacted with two separate extraction solvents to recover two separate streams, wherein the first stream includes manganese and the second stream includes zinc. Appropriate extraction solvents for the extraction of manganese and zinc have been previously discussed. The manganese in the first stream can be reacted in step 950 with an acid, such as sulfuric acid, hydrochloric acid, hydrobromic acid, or a like acid to produce a manganese salt, which can then be recovered by precipitation in step 960. The zinc in the second stream can be recovered by electrochemical means, such as electrowinning or like means, or may also be reacted in step 970 with an acid, such as sulfuric acid, hydrochloric acid, hydrobromic acid, or a like acid to produce a salt solution and recovered in step 980 by precipitation, evaporative crystallization, spray drying, or a like process. As previously discussed, as shown by the dashed line, following recovery of the manganese and zinc salts in steps 960 and 980, the respective solutions can be recycled to solvent extraction step 940.

Figure 10:
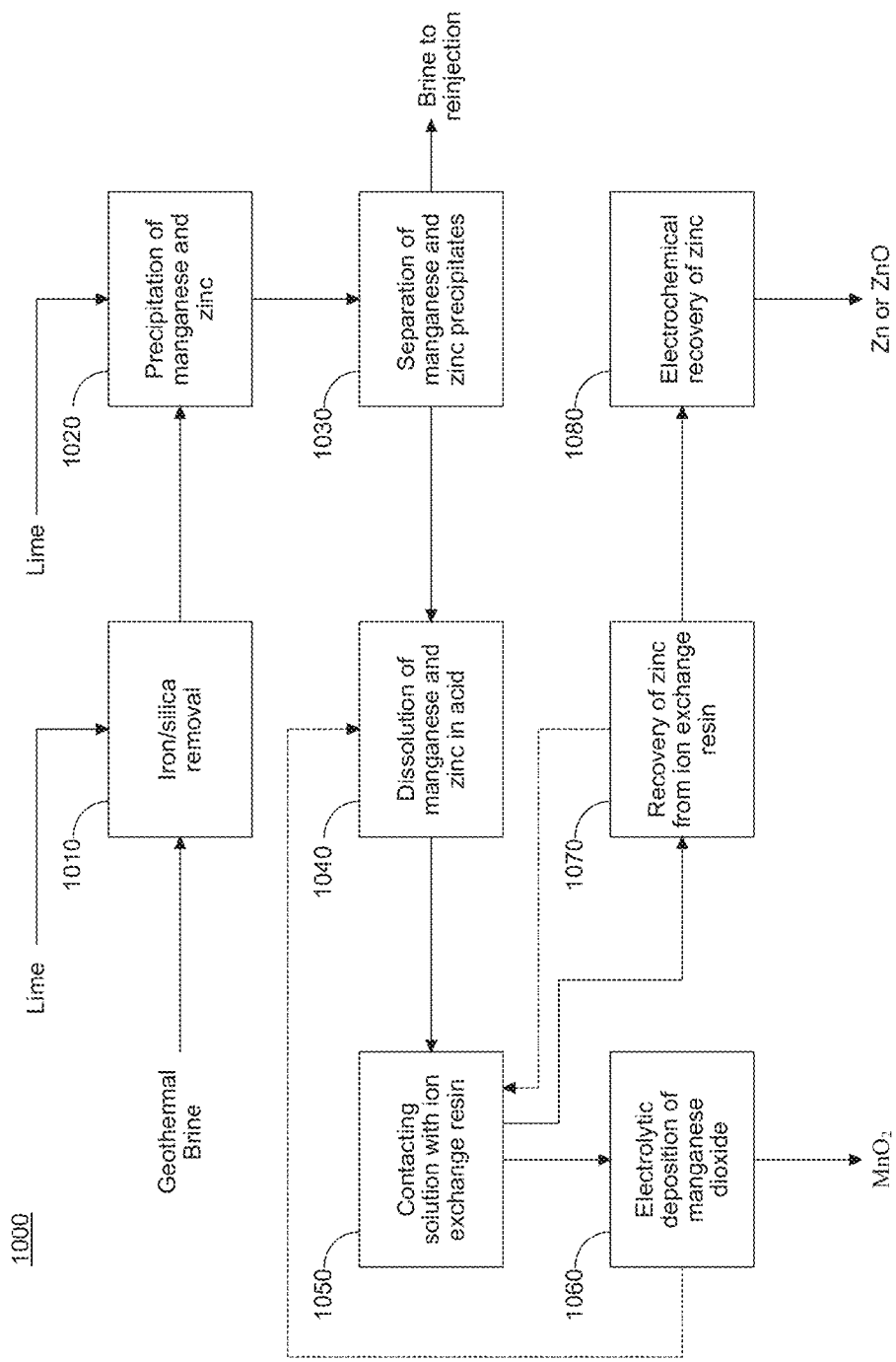
FIG. 10 illustrates another process for the recovery of manganese and zinc from a geothermal brine according to another embodiment of the invention.

In another embodiment, as shown in FIG. 10 process 1000 for the recovery of manganese or zinc from a geothermal brine is provided. As previously discussed, first step 1010 of the process includes the removal of iron and silica from the brine solution. In certain embodiments, the iron is oxidized and base is added to control the pH of the solution to between about 4.5 and 6, preferably between about 4.75 and 5.5. In certain embodiments, iron is oxidized with air and the base is calcium oxide or calcium hydroxide.

Following the removal of the iron and silica, in precipitation step 1020 additional base is added to achieve a pH of between about 6 and 9, preferably up to about 8 when sparged with air, or up to about 9 when it is not sparged with air, to facilitate the precipitation of manganese and zinc. The manganese and zinc precipitates are separated in step 1030, collected by known means and dissolved in an acid solution in step 1040, as previously discussed herein. Optionally, the acid solution, which includes the manganese and zinc, can be purified, as previously discussed. In certain embodiments, the remaining brine solution from extraction step 1030, from which the manganese and zinc have been removed, can then be reinjected into the geothermal well from which the brine was originally removed.

The acid solution is contacted with an ion exchange resin in step 1050, preferably a basic anionic exchange resin, to remove zinc from the solution. In step 1060, manganese can be recovered from the solution by electrolytically depositing manganese dioxide from the substantially silica free brine, such as by electrowinning or a like process. In step 1070, zinc can then be recovered from the ion exchange resin by known means, and can be converted electrochemically in step 1080 to zinc, and the zinc can then be converted to zinc oxide by known means. Optionally, as shown by the dashed line, following removal of the manganese in step 1060, the remaining solution can be recycled to dissolution step 1040. Similarly, as shown by the dashed line, following zinc recovery step 1070, the remaining brine solution can be recycled to ion exchange resin contacting step 1050.

In certain embodiments, an aqueous chloride solution is employed to wash zinc from the ion exchange resin, preferably having a chloride concentration of between about 0.5 and 5%. Optionally, multiple ion exchange resins can be employed. Optionally, at least a portion of a zinc solution produced by washing the ion exchange resin can be recycled to a prior stage of the process. In certain embodiments, the zinc solution produced by washing the ion exchange resin can be extracted with a solvent, wherein the solvent advantageously extracts zinc from the solution. Exemplary extraction solvents have been previously discussed, and can include D2EHPA, polyvinyl pyrrolidone, or the like. Following removal of zinc from the ion exchange resin, a zinc-rich solution is obtained and zinc can then be recovered electrochemically from the zinc-rich solution.

Figure 11:
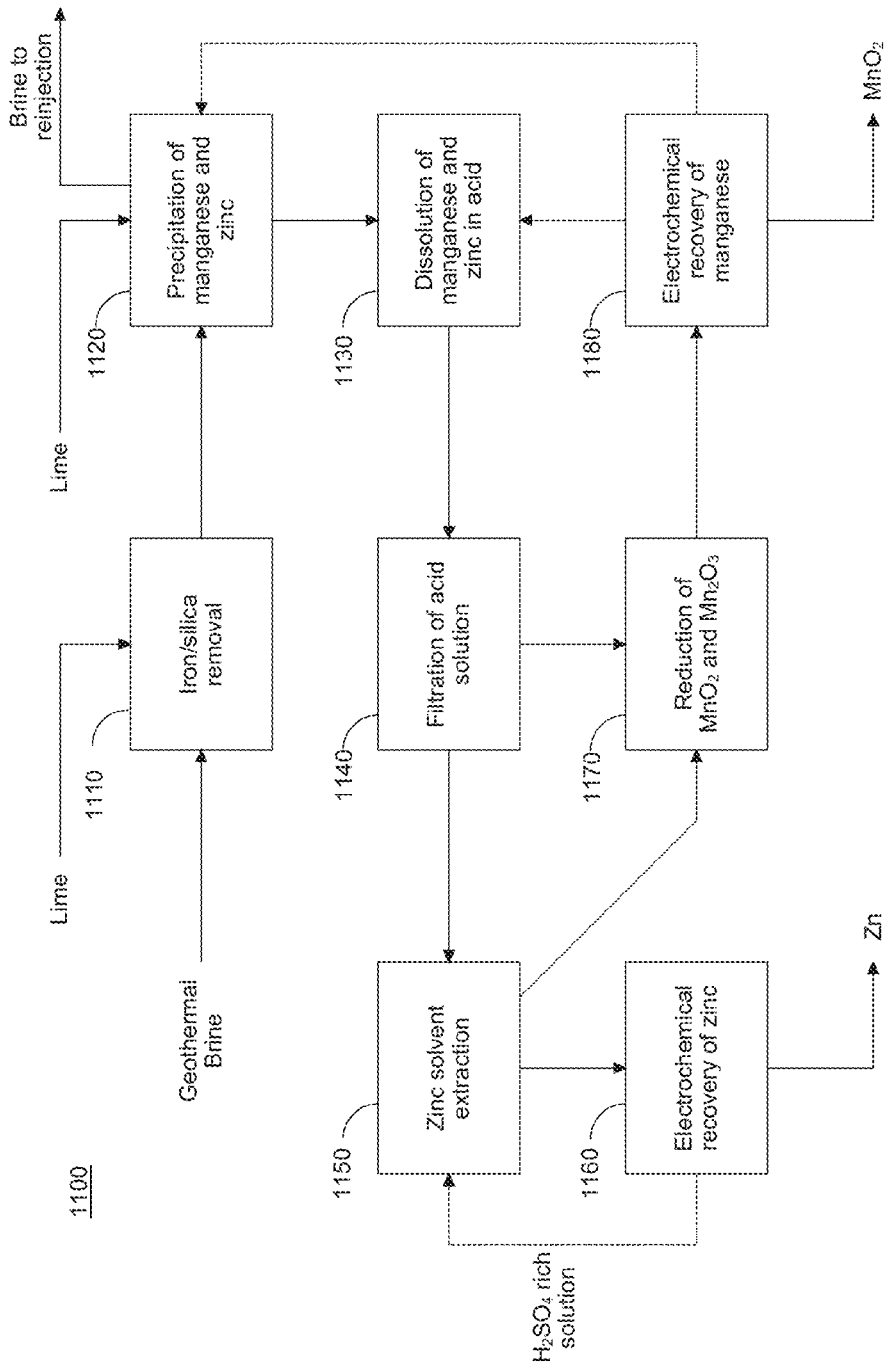
FIG. 11 illustrates another process for the recovery of manganese and zinc from a geothermal brine according to another embodiment of the invention.

Referring now to FIG. 11, in another aspect, an eleventh process 1100 for the recovery of manganese and/or zinc from a geothermal brine is provided. First step 1110 of the process 1100 includes the removal of iron and silica from the brine solution, as previously described herein. In certain embodiments, the iron is oxidized and base is added to control the pH of the solution to between about 4.5 and 6, preferably between about 4.75 and 5.5. In certain embodiments, iron is oxidized with air and the base is calcium oxide or calcium hydroxide.

Following the removal of the iron and silica, in precipitation step 1120, additional base is added to cause the precipitation of manganese and zinc. The manganese and zinc precipitates are collected by known means and, in step 1130, dissolved in an acid solution, as previously discussed herein. Optionally, the acid solution that includes the manganese and zinc can be purified. In certain embodiments, the remaining brine solution from dissolution step 1130, from which the manganese and zinc have been removed, can then be reinjected into the geothermal well from which the brine was originally removed.

The acid solution is filtered in step 1140 to produce a manganese containing solution and zinc precipitates. The solution is passed to zinc solvent extraction step 1150 to recover remaining zinc. Zinc precipitates are electrochemically converted to zinc metal in step 1160. The manganese containing solution from the filtration step is provided to a reduction step 1170 wherein the manganese containing solution is contacted with a reducing agent, such as $SO_2$. In step 1080, the reduced manganese can be recovered from the solution by electrolytically depositing manganese dioxide, such as by electrowinning.

Optionally, as shown by the dashed line, following recovery of zinc in electrochemical recovery step 1160, a sulfuric acid-rich solution can be recycled to zinc extraction step 1150. Similarly, as shown by the dashed line, following the electrochemical recovery of manganese in step 1180, the remaining brine solution can be recycled to either precipitation step 1120 or dissolution step 1130.

Figure 12:
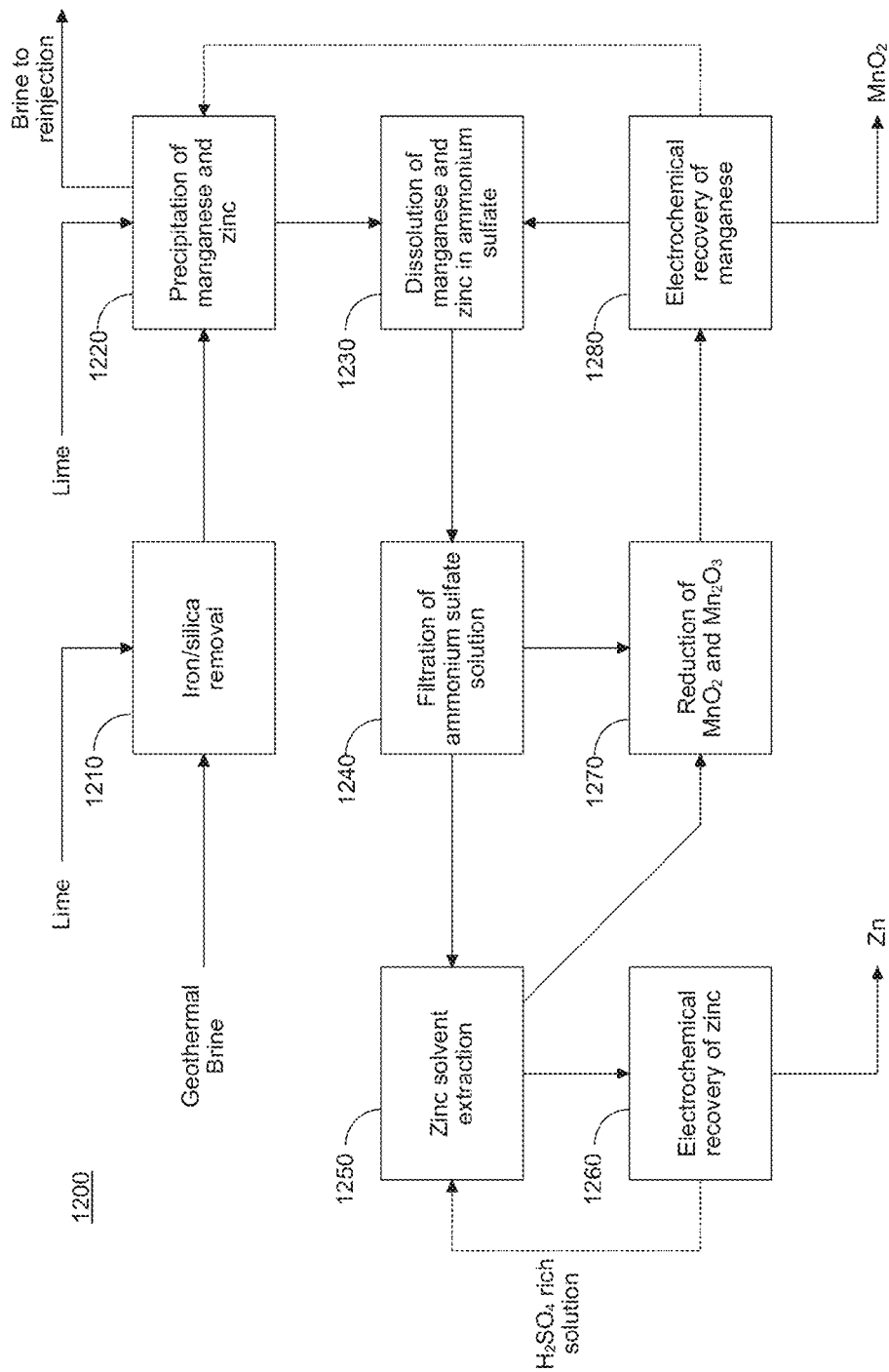
FIG. 12 illustrates another process for the recovery of manganese and zinc from a geothermal brine according to another embodiment of the invention.

Referring now to FIG. 12, in another aspect, a twelfth process 1200 for the recovery of manganese and/or zinc from a geothermal brine is provided. First step 1210 of the process 1200 includes the removal of iron and silica from the brine solution, as previously described herein. In certain embodiments, the iron is oxidized and base is added to control the pH of the solution to between about 4.5 and 6, preferably between about 4.75 and 5.5. In certain embodiments, iron is oxidized with air and the base is calcium oxide or calcium hydroxide.

Following the removal of the iron and silica, in precipitation step 1220, additional base is added to cause the precipitation of manganese and zinc. The manganese and zinc precipitates are collected by known means and, in step 1230, dissolved in an ammonium sulfate solution. Optionally, the ammonium sulfate solution that includes the manganese and zinc can be purified. In certain embodiments, the remaining brine solution from dissolution step 1230, from which the manganese and zinc have been removed, can then be reinjected into the geothermal well from which the brine was originally removed.

The ammonium sulfate solution is filtered in step 1240 to produce a manganese containing solution and zinc precipitates. The solution is passed to zinc solvent extraction step 1250 to recovery remaining zinc. Zinc precipitates are electrochemically converted to zinc metal in step 1260. The manganese containing solution from the filtration step is provided to a reduction step 1270 wherein the manganese containing solution is contacted with a reducing agent, such as $SO_2$. In step 1280, the reduced manganese can be recovered from the solution by electrolytically depositing manganese dioxide, such as by electrowinning.

Optionally, as shown by the dashed line, following recovery of zinc in electrochemical recovery step 1260, a sulfuric acid-rich solution can be recycled to zinc extraction step 1250. Similarly, as shown by the dashed line, following the electrochemical recovery of manganese in step 1280, the remaining brine solution can be recycled to either precipitation step 1220 or dissolution step 1230.

In certain embodiments of the present invention, as described herein, solid zinc oxide produced electrochemically or by ion exchange extraction can be dissolved in various acids for the production of zinc compounds. For example, in one embodiment, zinc oxide can be added to hydrochloric acid to form solid zinc chloride. The solid zinc chloride can then be separated by filtration. In certain embodiments, the zinc chloride can be isolated from solution by removing the liquid by evaporation, spray drying, or other known methods. In an alternate embodiment, zinc oxide can be added to hydrobromic acid to form zinc bromide. Alternatively, zinc oxide can be added to sulfuric acid to form zinc sulfate. Alternatively, zinc oxide can be added to methylsulfonic acid to form zinc methylsulfonate. In certain embodiments, to facilitate precipitation of the various zinc compounds, a portion of the solution can be evaporated, or the zinc compound can be separated by spray drying. In certain embodiments, recovered solid zinc compounds can be washed with minimal water and dried.

Use of Amines and Ammonium Salts

In certain embodiments, the present invention utilizes the coordination chemistry of the various metals to facilitate separation thereof. For example, the binding affinity or binding strength of transition metals with certain amine compounds, including primary, secondary, and tertiary amines, to preferentially form either a solid precipitate or a soluble complex can change, depending upon several experimental factors. Exemplary factors that can affect whether the metal salt will typically form a solid precipitate include basicity of the amine, the hydrophilic/hydrophobic nature of the amine, steric hindrance of the amine, whether the amine coordinates directly with the metal or forms one or more polymeric coordination complexes with the metal, solution pH, ionic strength of the solution, crystallization kinetics, and solvation properties. Because the formation of metal-amine coordination complexes can be influenced by so many factors, in general, it can be very difficult to customize/optimize an amine to selectively precipitate or dissolve a targeted metal(s) from a geothermal brine or solution that includes a targeted metal merely by identifying the binding characteristics of the metal for a given amine. In this context, ammonia, an inorganic amine, is very unique in that it can act as both base and a ligand simultaneously, depending upon the solution conditions, such as the pH and/or the concentration of metal salts and/or ammonia in the solution.

For example, in certain embodiments, ammonia reacts with certain hexaaqua metal ions in solution to form metal hydroxide (see, eq. 1 and 2) precipitates or soluble metal ammonium coordination complexes (see, eq. 3), depending upon ammonia concentration. In equations 1 and 2, ammonia acts as a base to form the metal hydroxide precipitates. In equation 3, ammonia acts as a ligand, resulting in a clear solution having the metal complex dissolved therein. ⇌

$$[M(H_2O)_6]^{2+} + NH_3 \rightleftharpoons [M(H_2O)_5(OH)]^+ + NH_4^+ \qquad \text{eq. 1.}$$

$$[M(H_2O)_6]^{2+} + 2NH_3 \rightleftharpoons [M(H_2O)_4(OH)_2] + 2NH_4^+ \qquad \text{eq. 2.}$$

$$[M(H_2O)_6]^{2+} + 6NH_3 \rightleftharpoons [M(NH_3)_6]^{2+} \qquad \text{eq. 3.}$$

Furthermore, it certain embodiments, the metal ion and ammonia can form one of several possible intermediate complex species that may be isolated, wherein the metal ion coordination sphere can include ammonia, water and hydroxyl groups, depending upon the composition of the salt solution, temperature, pH, and ammonia concentration. The chemical equilibrium involving the precipitation and dissolution of metals salts can thus be advantageously used to selectively isolate certain transition metals from brines and metal containing solutions.

Figure 13:
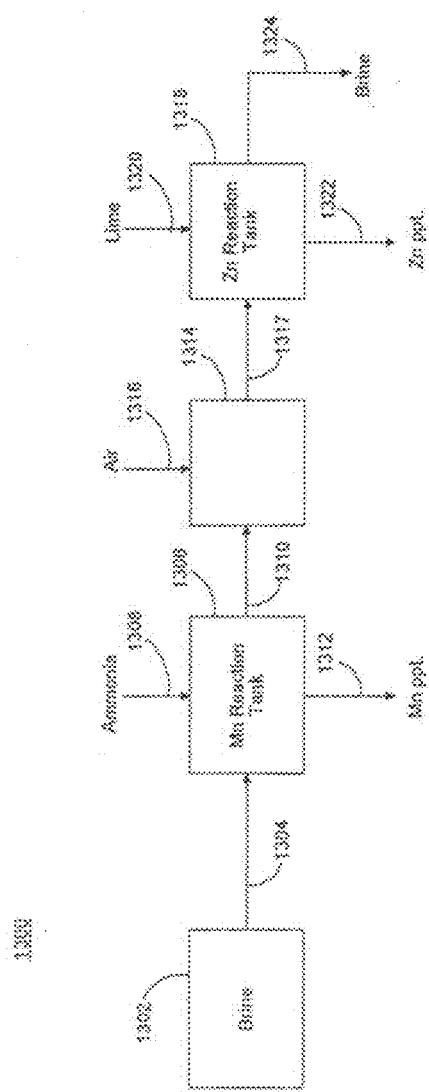
FIG. 13 is an exemplary reaction scheme according to one embodiment of the present invention.

Referring now to FIG. 13, one embodiment of the present invention is provided. Process 1300 for the selective removal of manganese from a manganese containing solution, such as a geothermal brine, is provided. Brine 1302 is provided via line 1304 to manganese reaction tank 1306. Ammonia is supplied via line 1308 to manganese reaction tank 1306, where it contacts the manganese containing solution to selectively precipitate manganese having a purity of greater than 95%, alternatively greater than about 97%, alternatively greater than about 99%. The manganese reaction tank 1306 is maintained at a pH of at least about 6.8, alternatively at least about 8.2, alternatively at least about 8.4, to limit co-precipitation of other metal ions. A manganese-oxide/hydroxide precipitate can be collected from reaction tank 1306 via line 1312. In certain embodiments, it is believed that the manganese-oxide/hydroxide may include a high percentage of $Mn_3O_4$. The brine, having a reduced concentration of manganese, also referred to as a manganese depleted brine solution, can optionally be supplied via line 1310 to a holding tank 1314. In certain embodiments, the brine can be supplied via line 1310 into an injection well (not shown). Air is supplied via line 1316 to produce a reduced pH brine solution having a pH of less than about 7, alternatively less than about 6, alternatively between about 5 and 6. The reduced pH brine solution can be supplied from holding tank 1314 via line 1317 to zinc reaction tank 1318, which can also be supplied with lime supplied via line 1320, to increase the pH to greater than about 7, alternatively be a pH of between about 7.2 and 7.7, alternatively about 7.5, thereby causing the zinc to precipitate. The zinc precipitate can be collected via line 1322, and the remaining brine solution, having a reduced concentration of both manganese and zinc, also referred to as a manganese and zinc depleted brine solution, can be removed via line 1320. Brine removed via line 1324 can be supplied to an alternate process for the recovery of additional metal ions, or alternatively can be supplied to an injection well (not shown).

Figure 14:
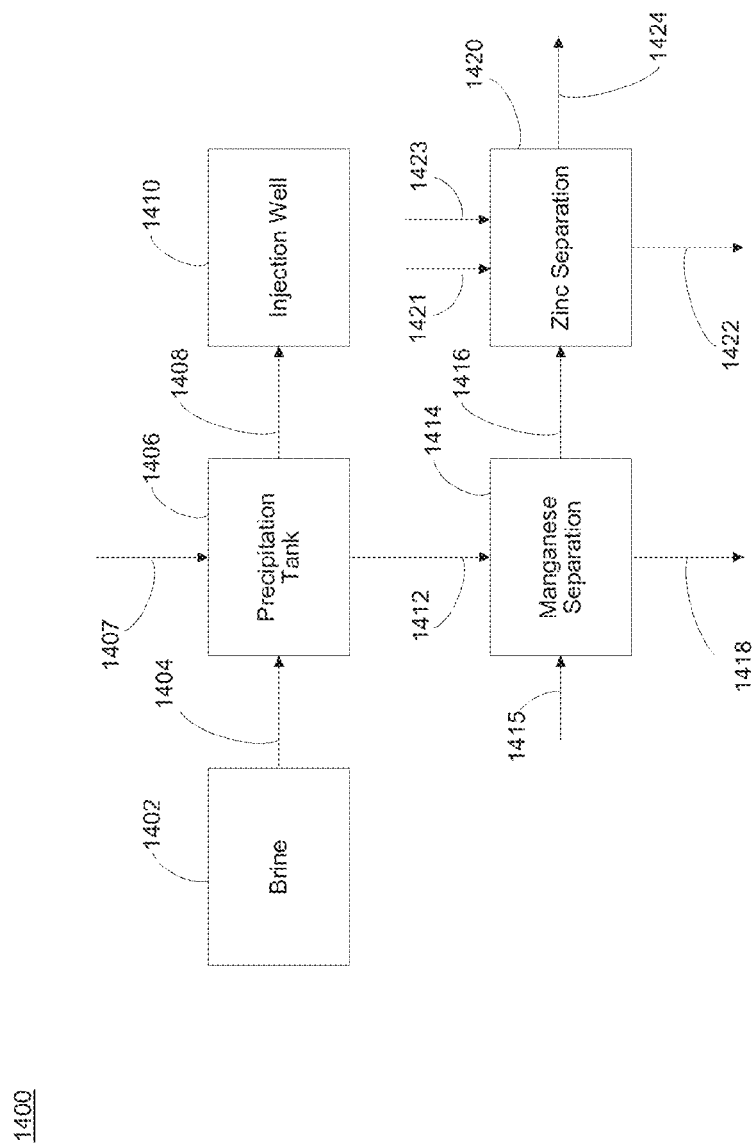
FIG. 14 is an exemplary reaction scheme according to one embodiment of the present invention.

Referring now to FIG. 14, another embodiment of the present invention is provided. Process 1400 for the selective removal of manganese and zinc from a manganese and zinc containing solution, such as a geothermal brine, is provided. Brine that includes manganese and zinc is provided from tank 1402 via line 1404 to precipitation tank 1406, where the brine is combined with lime supplied via line 1407 to provide a pH of between about 7.5 and 8, thereby precipitating zinc and manganese. The remaining brine solution, have a decreased concentration of manganese and zinc, can be supplied via line 1408 to injection well 1410, or alternatively supplied to an alternate process for the removal of additional metal ions (not shown). The solid manganese and zinc can be supplied from tank 1406 via line 1412 to a manganese separation process 1414, where the solids are contacted with an ammonium salt that is supplied via line 1415, until a pH of at least about 8.5, alternatively about 9.0 is achieved, to dissolve zinc precipitates, while the manganese remains as a solid. The solid manganese is collected via line 1418, and the zinc containing solution 1416 is supplied to a zinc precipitation process 1420. The zinc containing solution is contacted with air supplied via line 1421, preferably supplied via a bubbler, and lime supplied via line 1423, to produce a pH of less than 8, preferably between about 7.2 and 7.7, more preferably about 7.5. Lowering the pH is effective to produce a zinc precipitate, which can be collected via line 1422. Waste solution can be removed via line 1424.

It is understood that various means can be employed for isolating precipitated solids, including filters, settling tanks, centrifuges, and the like. It is also understood that purification of collected solids can include means for washing solids with water.

Figure 15:
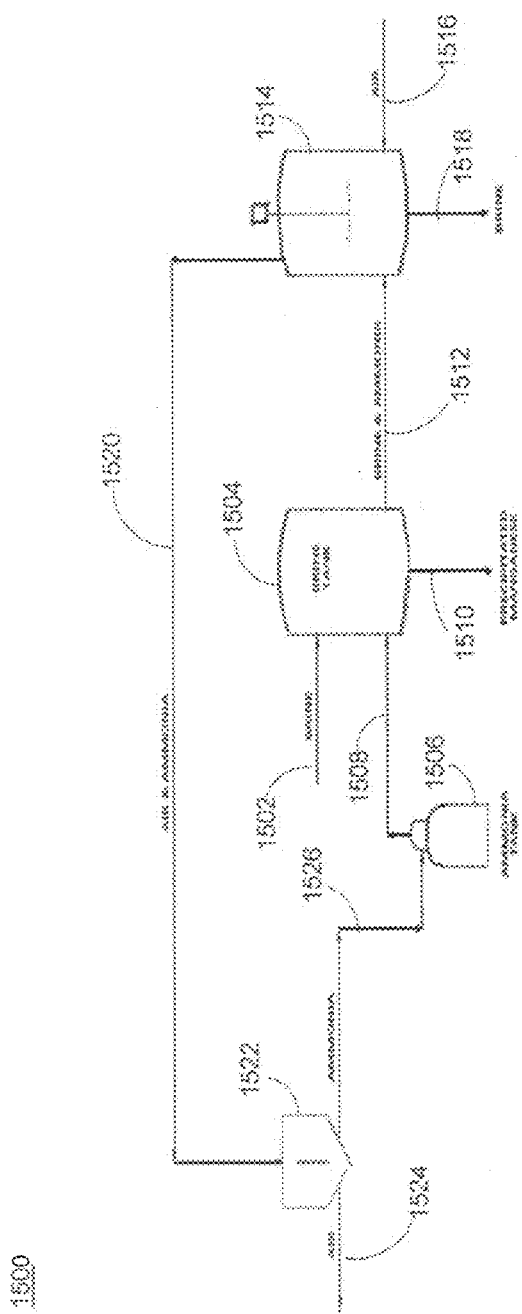
FIG. 15 is a process diagram according to another aspect of the present invention.

Referring now to FIG. 15, one embodiment of the present invention is provided. In process 1500, brine is supplied from a holding tank or directly from the source, such as a geothermal well, via line 1502 to brine tank 1504. To brine tank 1504, ammonia can be supplied via line 1508 from ammonia tank 1506. Ammonia is supplied in known amounts to selectively precipitate manganese present in the brine, which other ions remain in solution. The solid manganese precipitate can be collected from brine tank 1504 via line 1510. The solution in brine tank 1504, which includes brine (having a lower manganese concentration than originally supplied) and ammonia are supplied via line 1512 to tank 1514, which can include stirring means, such as a mechanical stirrer, and can be supplied with air via line 1516. Air can be added via line 1516 to reduce the pH of the solution selectively to less than 7, preferably between 5 and 6. Ammonia can be removed as a gas from tank 1514 via line 1520 and ammonia-free brine can be removed from the tank via line 1518. Ammonia removed via line 1520 can be supplied to a separation tank 1522 wherein air is separated via line 1524 and ammonia is separated via line 1526, and can be recycled back to ammonia tank 1506. In certain embodiments, ammonia tank 1506 can be supplied with fresh make up ammonia, as needed or desired.

Extraction of Lead

In certain aspects of the invention, the process for selectively removing manganese and zinc from brine solutions can also include steps for the removal and recovery of lead from brine solutions. In addition to providing a source for the production of lead, the process also results in higher purity manganese, as a portion of the lead can be present in the recovered manganese.

Figure 17:
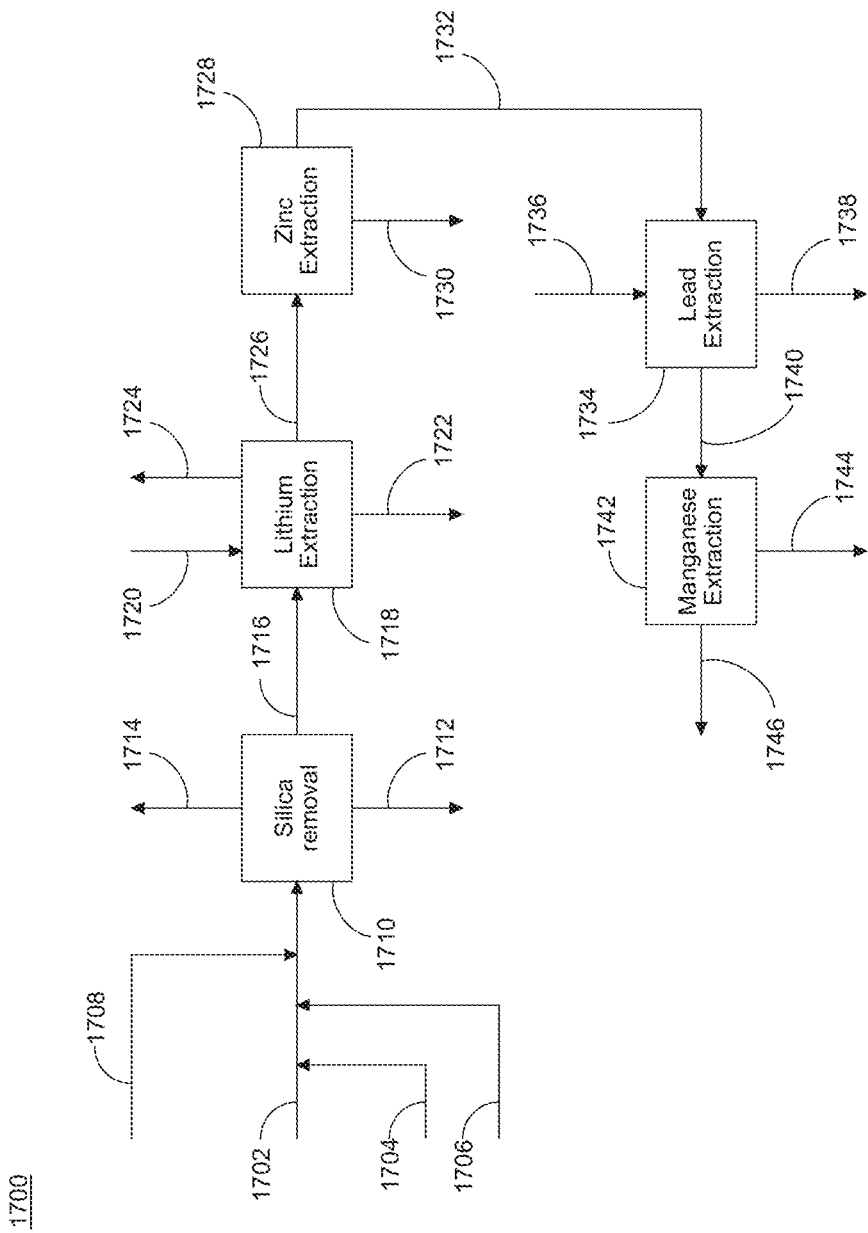
FIG. 17 is a process diagram according to another aspect of the present invention.

As shown in FIG. 17, a process 1700 for the extraction of various metals from brine, according to one aspect of the present invention, is provided. Brine is supplied via line 1702 and is combined with air supplied via line 1704, lime (20% solution by volume) supplied via line 1706, and flocculant (0.025% by volume in water) supplied via line 1708 in silica removal reactor 1710. Exemplary flow rates are as follows: brine (6 gal/min), flocculant (0.01 gal/min), air (100 cfm), and lime (0.5 lb/min). In silica removal reactor, a solid silica precipitate is formed, which is then removed via line 1712. Air and water vapor can be removed from silica removal reactor 1710 via line 1714. Under the exemplary flow conditions, for a brine solution having a silica concentration of about 10 ppm, production of the wet silica cake is about 15 lb/hr. A silica lean brine solution can then be supplied via line 1716 to a lithium extraction reactor 1718. Lithium extraction reactor 1718 can include a lithium aluminum intercalate or other extraction medium that has been prepared for the purposes of extracting lithium. Lithium extraction reactor 1718 can include a water inlet 1720, a lithium salt extraction line 1722 for removal of lithium, typically as a chloride salt, after the salt has extracted from the silica lean brine. Water vapor can be removed from reactor 1718 via line 1724.

A brine solution that is lean in both silica and lithium can be supplied via line 1726 to zinc extraction process 1728, which in certain embodiments can be an ion exchange resin that is designed to extract zinc ions, while allowing other ions to pass through the membrane. Zinc chloride can be collected from the extraction process via line 1730. The remaining brine solution, having had silica, lithium and zinc extracted therefrom, can be supplied via line 1732 to lead extraction reactor 1734. In certain embodiments, the brine solution supplied via line 1732 can have a pH of between about 5 and 6, and a temperature of between about 75° C. and 105° C. In lead extraction reactor 1734, the brine is contacted with a sulfide compound, such as hydrogen sulfide, sodium sulfide, sodium hydrogen sulfide, calcium sulfide, and the like, which can be supplied to the reactor via line 1736, to form lead sulfide. The lead sulfide precipitate can optionally be filtered or centrifuged, and then can be removed from reactor 1734 via line 1738.

Following the lead extraction, the remaining solution is supplied via line 1740 to manganese extraction reactor 1742, which can include any of the several different examples of manganese extraction that have been described herein. A remaining brine solution, having reduced concentration of silica, lithium, zinc, lead and manganese, can be collected via line 1744 and either injected into a geothermal well, or supplied to further extraction or other processes. A solid manganese oxide and/or manganese hydroxide precipitate (which can include $MnO_4$, $MnO_2$, and/or $Mn(OH)_2$) can be collected via line 1746. Preferably, air is excluded during the manganese precipitation.

Figure 18:
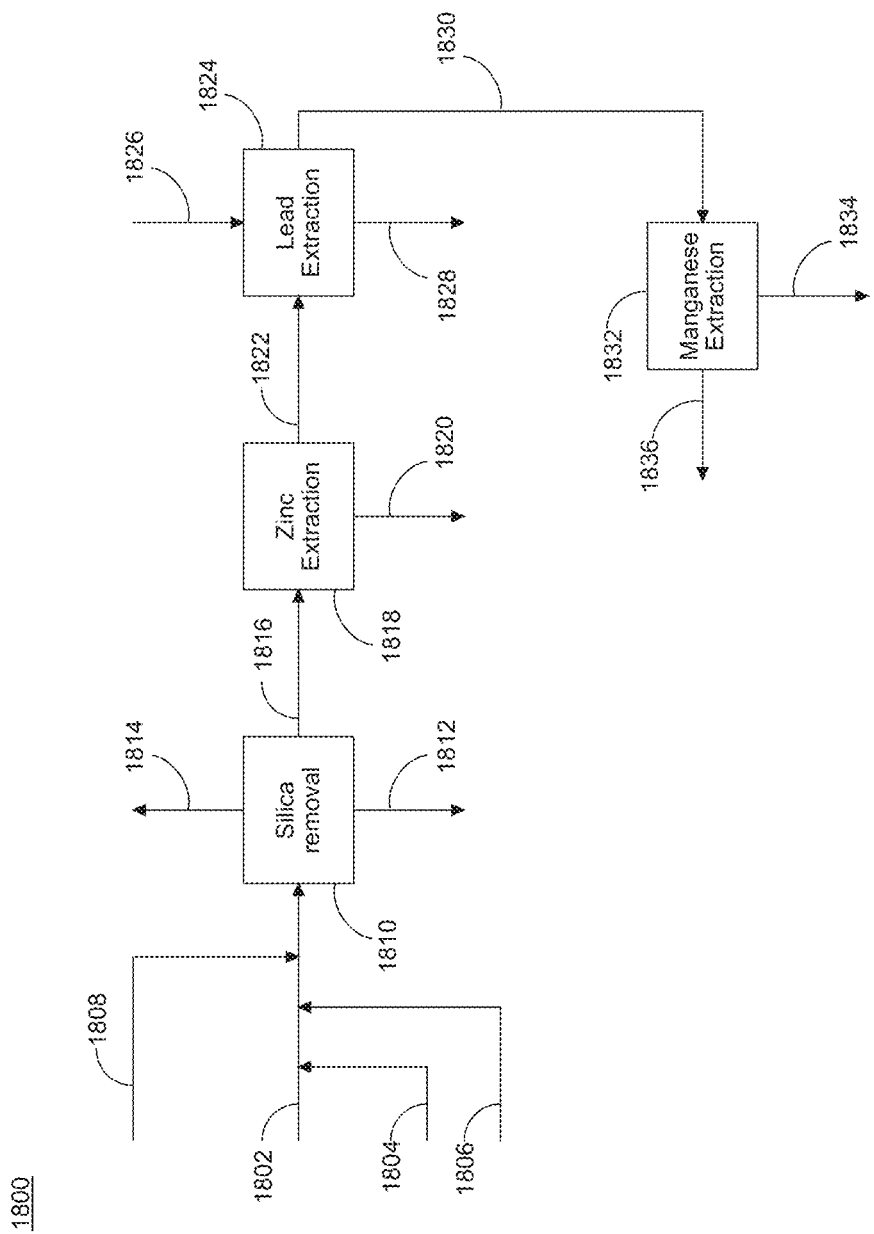
FIG. 18 is a process diagram according to another aspect of the present invention.

Referring now to FIG. 18, a process 1800 for the extraction of various metals from brine, according to one aspect of the present invention, is provided. Brine is supplied via line 1802 and is combined with air supplied via line 1804, lime (20% solution by volume) supplied via line 1806, and flocculant (0.025% by volume in water) supplied via line 1808 in silica removal reactor 1810. Exemplary flow rates are as follows: brine (6 gal/min), flocculant (0.01 gal/min), air (100 cfm), and lime (0.5 lb/min). In silica removal reactor, a solid silica precipitate is formed, which is then removed via line 1812. Air and water vapor can be removed from silica removal reactor 1810 via line 1814. Under the exemplary flow conditions, for a brine solution having a silica concentration of about 10 ppm, production of the wet silica cake is about 15 lb/hr. A silica lean brine solution can then be supplied via line 1816 zinc extraction reactor 1818, which in certain embodiments can be an ion exchange resin that is designed to extract zinc ions, while allowing other ions to pass through the membrane. Zinc chloride can be collected from the extraction process via line 1820. The remaining brine solution, having had silica and zinc extracted therefrom, can be supplied via line 1822 to lead extraction reactor 1824. In certain embodiments, the brine solution supplied via line 1822 can have a pH of between about 5 and 6, and a temperature of between about 75° C. and 105° C. In lead extraction reactor 1824, the brine is contacted with a sulfide compound, such as sodium sulfide, hydrogen sulfide, sodium hydrogen sulfide, calcium sulfide, and the like, which can be supplied to the reactor via line 1826, to form a lead sulfide precipitate. The lead sulfide precipitate can be removed from reactor 1824 via line 1828.

Following the lead extraction, the remaining solution is supplied via line 1830 to manganese extraction reactor 1832, which can include any of the several different examples of manganese extraction that have been described herein. A remaining brine solution, having reduced concentration of silica, zinc, lead and manganese, can be collected via line 1834 and either injected into a geothermal well, or supplied to further extraction or other processes. A solid manganese oxide and/or manganese hydroxide precipitate can be collected via line 1836.

In certain embodiments, the silica removal process can also include the addition of one or more NORM inhibitors, such as Nalco 9355 and Nalco 1387, which is supplied to the silica removal reactor, along with the lime, air, brine and flocculent.

In certain embodiments, the lithium extraction process can be an ion exchange process. Additionally, in certain embodiments, the extraction of lithium may result in the co-extraction of trace amounts of other salts present in the brine solution, such as sodium, potassium, calcium, manganese, and zinc.

Following the manganese extraction, in the embodiments of the present invention exemplified by FIGS. 17 and 18, the remaining brine solution can have a pH of between about 4.9 and about 5.5, at a temperature of between about 90° C. and 100° C. Generally, in processes that include a lithium extraction step, the lithium concentration will be less than about 250 ppm, preferably less than about 100 ppm. Similarly, the concentrations of zinc, silica, lead and manganese, will all be decreased relative to the feed solution.

EXAMPLES

For testing purposes, a synthetic brine was employed for examples 1-3 having metal concentrations of approximately the following: 1600 mg/L Fe; 96 mg/L Si; 2500 mg/L Mn; 790 mg/L Zn; 290 mg/L Li; 41,000 mg/L Ca; 27,000 mg/L K; 85,500 mg/L Na; and 185 mg/L Sr.

Example 1

Approximately 1.22 L of the synthetic brine was placed in a 2 L reactor and maintained at a temperature of between about 90-95° C. and sparged with air at a rate of about 2.25 L/minute. The initial pH of the brine was about 4.89. To the reaction approximately 14 g of a 20% slurry of calcium hydroxide added. After addition of the slurry, a pH of about 2.85 was achieved, which gradually increased to approximately 3.56 after about 10 minutes. After 40 minutes, at which time the pH was about 2.9, approximately 5.33 g of a 20% slurry of calcium hydroxide was added, which raised the pH to about 4.07. The brine and the calcium hydroxide slurry were mixed for approximately 30 min, during which time the pH decreased to approximately 4.0, at which time approximately 21.22 g of the 20% slurry of calcium hydroxide was added. The addition of the calcium hydroxide slurry increased the pH to approximately 4.5. The mixture was stirred for about another 20 minutes, after which approximately 28.54 g of the calcium hydroxide slurry was again added, and the pH increased to approximately 5.18. The reaction was allowed to stir for about an additional minutes, and the solid was collected and weighed. The solid includes approximately 99.6% of the iron present in the brine and approximately 99.9% of the silica. Additionally, approximately 49.2% of the manganese present in the brine was removed.

Example 2

Approximately 1.32 L of the synthetic brine was placed in a 2 L reactor and maintained at a temperature of between about 90-95° C. and sparged with air at a rate of about 2.25 L/minute. The reaction was stirred for approximately 60 minutes and the pH of the solution was monitored. After about 60 minutes, a pH of about 2.05 was achieved. To the brine solution was added approximately 9.73 g of a 20% slurry of calcium hydroxide, which raised the pH to about 5.4. The brine and the calcium hydroxide slurry were mixed for approximately 30 min, during which time the pH decreased to approximately 3.4, at which time approximately 2.56 g of the 20% slurry of calcium hydroxide was added. The addition of the slurry increased the pH to approximately 4.9. The mixture was stirred for about another 20 minutes, after which approximately 1.21 g of the calcium hydroxide slurry was again added, and the pH increased to approximately 5.3. The reaction was allowed to stir for about an additional 70 minutes, and the solid was collected and weighed. The solid includes approximately 98% of the iron present in the brine and approximately 99% of the silica. Additionally, approximately 2% of the manganese present in the brine was removed.

Example 3

Approximately 1.32 L of the synthetic brine was placed in a 2 L reactor and maintained at a temperature of between about 90-95° C. and sparged with air at a rate of about 2.25 L/minute. The reaction was stirred for approximately 60 minutes and the pH of the solution was monitored. After about 22 minutes, a pH of about 2.52 was achieved. To the brine solution was added approximately 9.7 g of a 20% slurry of calcium hydroxide, which raised the pH to about 5.56. The brine and the calcium hydroxide slurry were mixed for approximately 13 min, during which time the pH decreased to approximately 4.27, at which time approximately 1.9 g of the 20% slurry of calcium hydroxide was added. The addition of the calcium hydroxide slurry increased the pH to approximately 5.2. The mixture was stirred for about another 5 minutes, during which time the pH decreased to approximately 4.49. Approximately 2.25 g of the calcium hydroxide slurry was again added, and the pH increased to approximately 5.17. The reaction was allowed to stir for about an additional 110 minutes, during which time the pH was maintained at between about 5.13 and 5.17, and the solid was collected and weighed. The solid includes approximately 95.6% of the iron present in the brine and approximately 88.5% of the silica. Additionally, approximately 2% of the manganese present in the brine was removed.

Example 4

A synthetic brine having a composition that includes about 330 mg/L Li; 2400 mg/L Mn; 740 mg/L Zn; 40,000 mg/L Ca; 26,000 mg/L K; 91,000 mg/L Na; 180 mg/L Sr and 0.8 mg/L Fe was placed in a 2 L reactor and maintained at a temperature of between about 90-95° C. and sparged with air at a rate of about 2.25 L/minute. The initial pH was approximately 5.5. After sparging the reactor with air, a calcium hydroxide slurry was added sufficient to bring the pH to approximately 6.6. Additional calcium hydroxide slurry was added over about the next 180 minutes at various intervals. During the addition of the calcium hydroxide slurry, the pH increased from an initial value of about 6.6 to 8. A precipitate was collected which included zinc and manganese. The process recovered about 95.2% of the manganese present in the brine, about 94.6% of the zinc present in the brine, about 0.8% of the calcium present in the brine, and about 75% of the iron present in the brine. Due to the high recovery of iron by this process, the need for removal is confirmed.

Example 5

A synthetic brine having a composition that includes about 326 mg/L Li; 2640 mg/L Mn; 886 mg/L Zn; 41,000 mg/L Ca; 28,000 mg/L K; 84,000 mg/L Na; 180 mg/L Sr and 0.3 mg/L Fe was placed in a 2 L reactor and maintained at a temperature of between about 90-95° C. and sparged with air at a rate of about 2.25 L/minute. After sparging the reactor with air, a calcium hydroxide slurry was added in a single dosage sufficient that the pH of the brine solution was measured immediately after addition of the calcium hydroxide slurry and was about 7.6. During the stirring and sparging of the reaction, the pH increased from an initial value of about 7.6 to 7.9 after approximately 15 minutes, and then decreased gradually to about 7.5. A precipitate was collected which included zinc and manganese. The process recovered about 100% of the manganese present in the brine, about 99.9% of the zinc present in the brine, and about 8% of the lithium present in the brine.

precipitated with the manganese varied from between about 0 to 10%, depending upon the pH of the solution. Furthermore, the solids that precipitated at a pH of about 8 were washed, dried (at 100° C.) and digested to analyze the components of the precipitate and purity of the manganese solids. The digested sample revealed the presence of only two metal elements were present, specifically Mn (366.4 mg/g) and Zn (8.06 mg/g). The remainder of metal elements, if present, were below detection limits.

Figure 16:
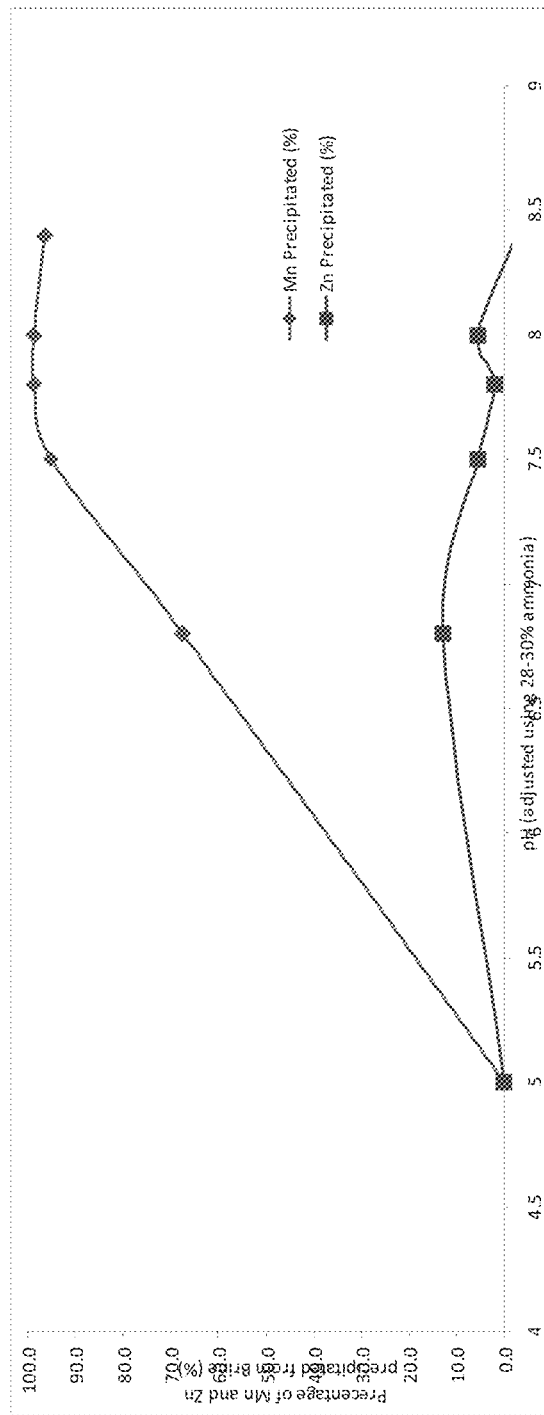
FIG. 16 is a graph showing precipitation of manganese as a function of pH.

The results of the analysis at various pH values is provided in both FIG. 16 and Table 1, which shows the composition of the synthetic brine before contacting with ammonia, and the composition of the decanted brine that has been separated from the precipitated solids at various different pH levels. As shown in the table, at a pH of about 6.8, approximately 67% of manganese and 13% of zinc that was initially present in the brine solution precipitated around pH 6.8, however, as the pH is increased to about 7.8, the percentage of manganese that was precipitated increased up to a maximum of almost 99%, while the amount of zinc that is precipitated decreases to about 2%.

TABLE 1

| Brine composition after precipitation using 28-30% ammonia solution | | | | | | | | | | |
|---|---|---|---|---|---|---|---|---|---|---|
| | Ba, mg/L | Ca, mg/L | K, mg/L | Li, mg/L | Mg, mg/L | Mn, mg/L | Na, mg/L | Sr, mg/L | Zn, mg/L | B, mg/L |
| Control | 194.4 | 41120 | 23060 | 283.7 | 11.96 | 2311 | 73650 | 418.1 | 777.3 | 511.1 |
| pH 6.8 | 234.2 | 48610 | 27420 | 341.8 | 20.51 | 746.9 | 86860 | 497.4 | 676.5 | 566.5 |
| pH 7.5 | 212.4 | 44050 | 24540 | 305.1 | 18.39 | 108.1 | 75880 | 432.9 | 734.4 | 537.8 |
| pH 7.8 | 194.7 | 40790 | 22670 | 279.9 | 15.88 | 28.56 | 71040 | 403.7 | 762.1 | 509.4 |
| pH 8 | 192.1 | 40280 | 22370 | 275.8 | 13.81 | 32.94 | 69490 | 395.3 | 734.1 | 498.4 |
| pH 8.4 | 217.2 | 43560 | 25130 | 317 | 5.551 | 84.03 | 78470 | 446.5 | 797.3 | 539.5 |

Example 6

Approximately 10 g of a synthetic geothermal brine having an approximate pH of 5.2 and a composition that mimics the composition of Salton Sea (generally, the simulated brine has a composition of about 260 ppm lithium, 63,000 ppm sodium, 20,100 ppm potassium, 33,000 ppm calcium, 130 ppm strontium, 700 ppm zinc, 1700 ppm iron, 450 ppm boron, 54 ppm sulfate, 3 ppm fluoride, 450 ppm ammonium ion, 180 ppm barium, 160 ppm silicon dioxide, and 181,000 ppm chloride) was titrated with a solution that contains about 28-30% by volume ammonia to a maximum pH of about 8.5. The solids began precipitating when the pH of solution was about 6.5. A portion of the brine was decanted and analyzed at various pH levels to identify and estimate the precipitated metal salts (see, Table 1 and FIG. 5). Table 1 shows that in the presence of ammonia, manganese precipitates from the brine solution with highest selectivity, and the amount of zinc that is co- As shown in FIG. 16, these results indicate that at higher pH values, i.e., at a pH of about 8.5, zinc forms a soluble coordination complex, with no measurable precipitate formed, while manganese forms a metal hydroxide/oxide precipitate. In certain embodiments, it is believed that the precipitated solids may be $MnO_2$ or $Mn_3O_4$ and ZnO. The manganese oxides purity from the digestion studies indicated the purity was about 98%. Further optimization of pH and experimental conditions could increase the manganese oxide purity to significantly higher levels.

Example 7

To show improvement in the purity of subsequently precipitated manganese when lead is removed by precipitation with sodium sulfide, the following manganese precipitation experiments were done using varying amounts of $Ca(OH)_2$. Actual brines were used in the Example 7.

TABLE 2

| Lead Concentration in Manganese Oxides Precipitates. | | | | | | | | | |
|---|---|---|---|---|---|---|---|---|---|
| Process | $Ca(OH)_2$ g/L | 28% $NH_3$ mL/L | Air | % B | % Ca | % Mg | % Mn | % Pb | % Zn |
| 1 Mn ppt ($NH_3$ + $Ca(OH)_2$) | 3 | 1 | No | 0.07 | 0.3 | 0 | 71 | 0.2 | 0.03 |
| 2 Mn ppt ($NH_3$ + $Ca(OH)_2$) | 4 | 1 | No | 0.08 | 0.3 | 0.7 | 69 | 0.6 | 0.1 |
| 3 Mn ppt ($NH_3$ + $Ca(OH)_2$) | 6 | 1 | No | 0.06 | 4.1 | 3 | 59 | 0.07 | 0.07 |

TABLE 2-continued

Lead Concentration in Manganese Oxides Precipitates.

| Process | Ca(OH)$_2$ g/L | 28% NH$_3$ mL/L | Air | % B | % Ca | % Mg | % Mn | % Pb | % Zn |
|---|---|---|---|---|---|---|---|---|---|
| 4 Mn ppt (NH$_3$ + Ca(OH)$_2$) after Pb sep. with Na$_2$S | ~6 | 0 | Yes | 0.06 | 2.1 | 2.5 | 58 | 0.02 | 0 |
| 5 Mn ppt (Ca(OH)$_2$) | ~6 | 0 | Yes | 1 | 1.6 | 0.1 | 65 | 0.3 | 0.31 |

In the first trial, for the manganese precipitation, approximately 3 g of Ca(OH)$_2$ was added per liter of brine, along with approximately 1 mL of NH$_3$ per liter of brine. Trials 2 and 3 subsequently added additional Ca(OH)$_2$. Trial 4 utilized sodium sulfide for the removal of lead, prior to the manganese precipitation and utilizes Ca(OH)$_2$ (but did not utilize ammonia) for the manganese precipitation. Trial 5 utilized only Ca(OH)$_2$ for the precipitation of manganese, and did not use ammonia.

As shown in Table 2, trial 4, wherein the lead was removed by precipitation with sodium sulfide prior to the manganese precipitation, resulted in a manganese oxide product having a significantly reduced lead concentration. Lead concentration was reduced in the manganese precipitate to less than 200 ppm, as compared with upwards of about 30,000 ppm when lead was not removed prior to precipitation.

Example 8

Approximately 960 g of geothermal brine was contacted with 80 g of Cyphos IL101 (trihexyl(tetradecyl)phosphonium chloride) at about 95° C. and vigorously agitated for two minutes to selective extract manganese and zinc from the brine. Following removal of the aqueous solution, the manganese-and-zinc-containing Cyphos IL101 was contacted with hot water to selectively extract manganese from the solution. After manganese extraction from Cyphos IL101 was complete, the manganese depleted Cyphos IL 101 was again contacted with hot water to extract zinc.

Example 9

Approximately 960 g of geothermal brine was contacted with 80 g of Cyphos IL101 (trihexyl(tetradecyl)phosphonium chloride) at about 95° C. and vigorously agitated for two minutes to selectively extract manganese and zinc from the brine. Following removal, the manganese-and-zinc-containing Cyphos IL101 was treated with 0.5M HCl to selectively extract manganese from the solution. After manganese extraction from Cyphos IL101 was complete, the manganese depleted Cyphos IL 101 was again contacted with water to extract zinc. The manganese and zinc extractions were monitored using ICP mass spectrometry.

Example 10

Approximately 960 g of geothermal brine was contacted with 80 g of Cyphos IL101 (trihexyl(tetradecyl)phosphonium chloride) at about 95° C. and vigorously agitated for two minutes to selectively extract manganese and zinc from the brine. Following removal, the manganese-and-zinc-containing Cyphos IL101 was treated with 0.5M H$_2$SO$_4$ to selectively precipitate manganese from the solution. After manganese extraction from Cyphos IL101 was complete, the manganese depleted Cyphos IL 101 was again contacted with water to extract zinc. The manganese and zinc extractions were monitored using ICP mass spectrometry.

As is understood in the art, not all equipment or apparatuses are shown in the figures. For example, one of skill in the art would recognize that various holding tanks and/or pumps may be employed in the present method.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

As used herein, recitation of the term about and approximately with respect to a range of values should be interpreted to include both the upper and lower end of the recited range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

We claim:

1. A method for recovering manganese from a brine, the method comprising the steps of:
   providing an aqueous brine, said brine comprising manganese;
   contacting said brine with an ionic liquid and separating from the brine after the step of contacting an ionic liquid comprising extracted manganese; and
   treating said ionic liquid comprising extracted manganese with an aqueous solution to selectively recover manganese from the ionic liquid.

2. A method for recovering manganese and zinc from a brine, the method comprising the steps of
   providing an aqueous brine, said brine comprising manganese and zinc;
   contacting said brine with an ionic liquid to selectively extract manganese and zinc from said brine and separating from the brine after the step of contacting an ionic liquid comprising extracted manganese and zinc; and
   treating said ionic liquid comprising extracted manganese and zinc with an aqueous solution to selectively recover manganese from the ionic liquid, producing a manganese depleted, zinc rich ionic liquid.

3. The method of claim 2, further comprising the step of treating said manganese depleted, zinc rich ionic liquid with an aqueous solution to selectively recover zinc from the manganese depleted, zinc rich ionic liquid.

4. The method according to claim 1, wherein the ionic liquid is trihexyl(tetradecyl) phosphonium chloride.

5. The method according to claim 1, wherein the aqueous solution used to recover manganese from the ionic liquid is water.

6. The method according to claim 1, wherein the aqueous solution used to recover manganese from the ionic liquid is an acid.

7. The method according to claim 5, wherein the aqueous solution is at a temperature between about 80 to 95° C.

8. The method according to claim 6, wherein the acid is hydrochloric acid.

9. The method according to claim 8, wherein the hydrochloric acid is at a concentration of between about 0.25 to 1.25 Molar.

10. The method according to claim 6, wherein the acid is sulfuric acid.

11. The method according to claim 10, wherein the sulfuric acid is at a concentration of between about 0.25 to 1.25 Molar.

12. The method according to claim 2, wherein the aqueous solution is at a temperature between about 80 to 95° C.

13. The method according to claim 2, wherein the aqueous solution used to precipitate zinc from the ionic liquid is water.

14. The method according to claim 2, wherein the ionic liquid is trihexyl(tetradecyl) phosphonium chloride.

15. The method according to claim 2, wherein the aqueous solution used to recover manganese from the ionic liquid is water.

16. The method according to claim 2, wherein the aqueous solution used to recover manganese from the ionic liquid is an acid.

17. A method for recovering zinc from a brine, the method comprising the steps of:
provaging an aqueous brine, said brine comprising zinc;
contacting said brine with an ionic liquid and separating from the brine after the step of contacting an ionic liquid comprising extracted zinc; and
treating said ionic liquid containing extracted zinc with an aqueous solution to selectively recover zinc from the ionic liquid.

18. The method according to claim 17, wherein the ionic liquid is trihexyl(tetradecyl) phosphonium chloride.

19. The method according to claim 17, wherein the aqueous solution used to recover manganese from the ionic liquid is water.

20. A method for recovering lead from a brine, the method comprising the steps of:
providing an aqueous geothermal brine, said brine comprising lead;
contacting said geothermal brine with an ionic liquid to selectively extract lead from said brine and separating from the brine after the step of contacting an ionic liquid comprising extracted lead; and
treating said ionic liquid comprising extracted lead with an aqueous solution to remove other metals and produce a lead rich ionic liquid.

* * * * *